(12) United States Patent
Ohnishi et al.

(10) Patent No.: US 10,538,118 B2
(45) Date of Patent: Jan. 21, 2020

(54) INKJET RECORDING APPARATUS AND INKJET RECORDING METHOD

(71) Applicant: CANON KABUSHIKI KAISHA, Tokyo (JP)

(72) Inventors: Toru Ohnishi, Yokohama (JP); Noboru Toyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/018,182

(22) Filed: Jun. 26, 2018

(65) Prior Publication Data

US 2019/0009601 A1    Jan. 10, 2019

(30) Foreign Application Priority Data

Jul. 4, 2017    (JP) .................................. 2017-131557

(51) Int. Cl.
*B41J 2/005* (2006.01)
*B41M 5/00* (2006.01)
*C09D 11/40* (2014.01)

(52) U.S. Cl.
CPC .......... *B41M 5/0017* (2013.01); *B41J 2/0057* (2013.01); *C09D 11/40* (2013.01)

(58) Field of Classification Search
CPC ..... B41J 2/01; B41J 2/21; B41J 2/2107; B41J 2/211; B41J 2/5052; B41J 2/0057; B41J 11/0015; B41J 2002/012; B41M 1/18; B41M 1/20; B41M 1/26; B41M 5/5218; B41M 5/0017; C09D 11/40
See application file for complete search history.

(56) References Cited

U.S. PATENT DOCUMENTS

| 7,237,887 B2 | 7/2007 | Ueki et al. |
| 10,029,481 B2 | 7/2018 | Ohnishi et al. |
| 2005/0212884 A1 | 9/2005 | Ueki et al. |

(Continued)

FOREIGN PATENT DOCUMENTS

| JP | 2001-179959 A | 7/2001 |
| JP | 2005-271401 A | 10/2005 |

(Continued)

OTHER PUBLICATIONS

Extended European Search Report in European Application No. 18181347.8 (dated Nov. 9, 2018).

(Continued)

*Primary Examiner* — Kristal Feggins
(74) *Attorney, Agent, or Firm* — Venable LLP

(57) ABSTRACT

An inkjet recording apparatus according to the present invention includes an ink image forming unit for forming an ink image on an ink receiving medium by applying ink and reaction liquid for increasing viscosity of the ink onto the ink receiving medium and a liquid absorbing member having a porous body to be brought into contact with the ink image in order to absorb the liquid component from the ink image. The porous body of the liquid absorbing member includes a first layer having a first surface to be brought into contact with the ink image before liquid absorption and a second surface that is a rear surface relative to the first surface, and a second layer held in contact with the second surface of the first layer. The thickness of the first layer is not less than 0.08 times of the average pore size of the second layer.

21 Claims, 8 Drawing Sheets

(56) References Cited

U.S. PATENT DOCUMENTS

| | | |
|---|---|---|
| 2018/0297377 A1 | 10/2018 | Ohnishi et al. |
| 2018/0304616 A1 | 10/2018 | Honda et al. |
| 2018/0304617 A1 | 10/2018 | Ohnishi et al. |
| 2018/0319166 A1 | 11/2018 | Yamane et al. |
| 2018/0319188 A1 | 11/2018 | Toyama et al. |
| 2018/0319189 A1 | 11/2018 | Ohnishi et al. |

FOREIGN PATENT DOCUMENTS

| | | |
|---|---|---|
| JP | 2009-45851 A | 3/2009 |
| WO | 2017/119044 A1 | 7/2017 |
| WO | 2017/119045 A1 | 7/2017 |
| WO | 2017/119046 A1 | 7/2017 |
| WO | 2017/119047 A1 | 7/2017 |
| WO | 2017/119049 A1 | 7/2017 |

OTHER PUBLICATIONS

Surface Roughness: JIS B 0601: 2001 (2001).
Ohnishi et al., U.S. Appl. No. 16/022,223, filed Jun. 28, 2018.
Toyama et al., U.S. Appl. No. 16/022,118, filed Jun. 28, 2018.
Yamane et al., U.S. Appl. No. 16/022,143, filed Jun. 28, 2018.
Honda et al., U.S. Appl. No. 16/022,169, filed Jun. 28, 2018.
Ohnishi et al., U.S. Appl. No. 16/022,189, filed Jun. 28, 2018.
Ohnishi et al., U.S. Appl. No. 16/013,276, filed Jun. 20, 2018.
Torisaka et al., U.S. Appl. No. 16/019,905, filed Jun. 27, 2018.

INKJET RECORDING APPARATUS AND INKJET RECORDING METHOD

BACKGROUND OF THE INVENTION

Field of the Invention

The present invention relates to an inkjet recording apparatus and also to an inkjet recording method.

Description of the Related Art

With inkjet recording systems, images are formed by directly or indirectly applying liquid compositions (inks) that contain coloring materials onto recording mediums such as sheets of paper. When forming an image with an inkjet recording system, using ink, the phenomenon of curling and that of cockling can arise as the recording medium being used to form an image thereon excessively absorbs the liquid component contained in the ink. For this reason, techniques of drying recording mediums by means of warm currents of air, infrared rays or the like and those of forming images on transfer bodies and, after drying the liquid component contained in the ink images on the transfer bodies by thermal energy, transferring the ink images onto recording mediums such as sheets of paper have been devised.

Additionally, as means of removing the liquid component contained in the ink image formed on the transfer body, a technique of removing the liquid component by causing a porous body in the form of a roller to contact the ink image to absorb the liquid component from the ink image without using thermal energy has been proposed (Japanese Patent Application Laid-Open No. 2009-45851 and Japanese Patent Application Laid-Open No. 2005-271401).

Besides, a method of removing the liquid component from the ink image by causing a belt-shaped polymer absorber that is made of water-absorbent polymer fibers to contact the ink image and absorb and remove the liquid component from the ink image has been proposed (Japanese Patent Application Laid-Open No. 2001-179959).

SUMMARY OF THE INVENTION

This invention is made to provide an inkjet recording apparatus and an inkjet recording method that can suppress changes in the texture of the image formed by the recording apparatus.

In an aspect of the present invention, there is provided an inkjet recording apparatus including: an ink image forming unit for forming an ink image on an ink receiving medium by applying ink and reaction liquid for increasing viscosity of the ink onto the ink receiving medium; and a liquid absorbing member having a porous body to be brought into contact with the ink image in order to absorb at least part of liquid component from the ink image, the porous body including: a first layer having a first surface to be brought into contact with the ink image and a second surface that is a rear surface, relative to the first surface; and a second layer held in contact with the second surface of the first layer, wherein the second layer has an average pore diameter and the first layer has a thickness that is not less than 0.08 times of the average pore diameter of the second layer.

In another aspect of the present invention, there is provided an inkjet recording method including: an ink image forming step of forming an ink image by applying ink and reaction liquid for increasing viscosity of the ink onto an ink receiving medium; and a liquid absorbing step of causing a porous body for absorbing at least part of liquid component contained in the ink image to contact the ink image, the porous body including: a first layer having a first surface to be brought into contact with the ink image and a second surface that is a the rear surface relative to the first surface; and a second layer held in contact with the second surface of the first layer, wherein the second layer has an average pore diameter and the first layer has a thickness that is not less than 0.08 times of the average pore diameter of the second layer.

Further features of the present invention will become apparent from the following description of exemplary embodiments with reference to the attached drawings.

DESCRIPTION OF THE EMBODIMENTS

Figure 1A:
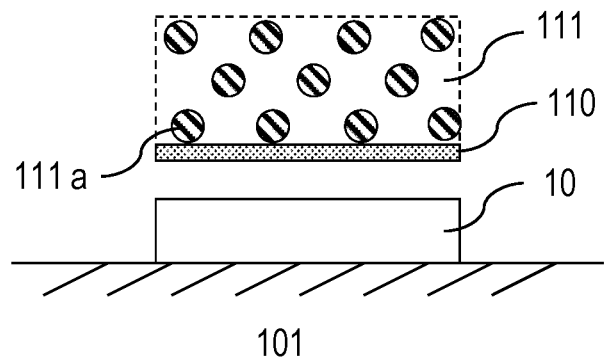
FIGS. 1A, 1B and 1C are an illustration for explaining the influence of the structure of the porous body included in the liquid absorbing member on the texture of an image.

All the operations of removing the liquid component from the ink image by means of a liquid absorbing member having a porous body as described in Japanese Patent Application Laid-Open No. 2009-45851, Japanese Patent Application Laid-Open No. 2005-271401 and Japanese Patent Application Laid-Open No. 2001-179959 are executed by causing the porous body to directly contact the ink image. However, as the inventors of the present invention looked into the techniques described in the above-listed patent literatures, they found that, after the liquid removal by means of the porous body, the ink image can show a change in the texture thereof under the influence of the contact by the porous body when compared the ink image before the contact with the porous body in order to remove liquid from the ink image.

The present invention was made by the inventors as a result of the intensive research efforts paid by the inventors of the present invention for the purpose of solving the above-identified problem. Now, the present invention will be described in detail by way of currently preferred embodiments of the invention.

A porous body having a multilayer structure can be used for the porous body for removing the liquid component from the ink image formed on an ink receiving medium. The use of a porous body having a multilayer structure is a preferable mode of carrying out the present invention from the viewpoint of further improving the efficiency of absorbing the liquid component from the ink image, increasing the capacity for absorbing the liquid component of the porous body and improving the strength of the porous body.

However, in the course of the study made by the inventors of the present invention, the inventors recognized that there can be instances where a change in the texture of the ink image as pointed out above occurs after removing the liquid component by means of a porous body having a multilayer structure from the image formed by reaction liquid for increasing the viscosity of ink and ink. The inventors looked into the cause of such a change in the texture of the ink image and reached to a presumption that the stress applied to the ink image by the porous body having a multilayer structure is not uniform during the contact between the ink image and the porous body from the time when the porous body is brought into contact with the image to the time when the porous body is moved away from the image and such stress unevenness is most probably the cause of the change in the texture.

Thus, the inventors of the present invention paid further research efforts to find out a desirably configured multilayer structure if a porous body having a multilayer structure is to be employed. As a result, the inventors newly found that the change in the texture of an ink image can effectively be controlled by adjusting the relationship between the thickness of the first layer and the pore size of the second layer. The present invention is based on this new finding. Note that none of Japanese Patent Application Laid-Open No. 2009-45851, Japanese Patent Application Laid-Open No. 2005-271401 and Japanese Patent Application Laid-Open No. 2001-179959 describe or otherwise suggest the technical problem of the change in the texture of the ink image and a desirable configuration of the porous body for solving the problem.

An inkjet recording apparatus according to the present invention includes an ink image forming unit for forming an ink image on an ink receiving medium by applying reaction liquid for increasing the viscosity of ink and ink onto the ink receiving medium and a liquid absorbing member having a porous body to be brought into contact with the ink image in order to absorb at least part of the liquid component from the ink image.

The porous body of the liquid absorbing member has a multilayer structure of at least two layers including a first layer and a second layer. The first layer and the second layer are laid one on the other byway of the interface where they directly contact with each other. The first layer has the first surface that is to be brought into contact with an ink image and the second surface that is the rear surface relative to the first surface, which second surface is the contact surface contacting the second layer.

The thickness of the first layer is not less than 0.08 times of the average pore size of the second layer.

An inkjet recording method according to the present invention includes the following steps.
(1) an ink image forming step of forming an ink image by applying reaction liquid for increasing the viscosity of ink and ink onto an ink receiving medium.
(2) a liquid absorbing step of causing a porous body for absorbing the liquid component contained in the ink image to contact the ink image.

A porous body as described above for the inkjet recording apparatus is employed for the porous body of the liquid absorbing member with the inkjet recording method according to the present invention.

The ink image forming unit of the inkjet recording apparatus may include a reaction liquid applying device for applying reaction liquid that increases the viscosity of ink onto an ink receiving medium and an ink applying device for applying ink onto the ink receiving medium. As an ink image is formed by ink and reaction liquid, the phenomenon of bleeding where the ink droplets that are applied side by side on the ink receiving medium are mixed with each other and the phenomenon of beading where the ink droplet that lands on the ink receiving medium earlier is drawn to the ink droplet that lands on the ink receiving medium later can effectively be suppressed. Ink and reaction liquid are applied onto the ink receiving medium in such a way that the applied ink and the applied reaction liquid at least partly overlap with each other. While the order in which ink and reaction liquid are applied is not subject to any particular limitations, preferably reaction liquid is applied first onto the ink receiving medium and thereafter ink is applied onto the medium from the viewpoint of promoting the settlement of the coloring material of the ink image and suppressing the appearance of the phenomenon of bleeding and that of beading.

Note that an ink image before being subjected to a liquid absorbing process and an ink image from which the content ratio of reaction liquid is reduced as a result of a liquid absorbing process are also respectively referred to as "an ink image prior to liquid removal" and "an ink image after ink removal" hereinafter.

Now, the present invention will be described below by way of currently preferred embodiments.

<Reaction Liquid Applying Device>

The reaction liquid applying device may be any device that can apply reaction liquid onto an ink receiving medium. In other words, any known device selected from devices of various types that belong to this category can appropriately be used. Specific examples of such devices include gravure offset rollers, inkjet heads, dye coaters and blade coaters. An operation of applying reaction liquid by means of the reaction liquid applying device may be conducted prior to the application of ink or after the application of ink so long as the applied reaction liquid can be made to mix (react) with the applied ink on the ink receiving medium. Preferably, however, ink is applied onto the ink receiving medium onto which reaction liquid has already been applied. As the application of reaction liquid comes prior to the application of ink, the appearance of the phenomenon of bleeding in which inks that are applied at respective positions located side by side are mixed with each other during an image recording operation by means of an inkjet system and also the appearance of the phenomenon of beading in which the ink that lands on the ink receiving medium earlier is drawn to the ink that lands on the ink receiving medium later can more effectively be suppressed.

<Reaction Liquid>

Now, each of the components of reaction liquid that can be used for this embodiment will sequentially be described in detail below.

(Reaction Agent)

Reaction liquid causes the components having one or more anionic groups (polymer, self-dispersible pigment and so on) of the applied ink to aggregate by contact of the ink and contains a reaction agent. Examples of reaction agents that can be used for the purpose of the present invention include polyvalent metal ions, cationic components such as cationic polymer and organic acids.

Examples of polyvalent metal ions include divalent metal ions such as $Ca'$, $Cu'$, $Ni^{2+}$, $Mg^{2+}$, $Sr^{2+}$, $Ba^{2+}$ and $Zn^{2+}$ and trivalent metal ions such as $Fe^{3+}$, $Cr^{3+}$, $Y^{3+}$ and $Al^{3+}$. Polyvalent metal salts (including hydrates thereof) that are formed as polyvalent metal ions and anions are bonded to each other can also be used to cause reaction liquid to contain polyvalent metal ions. Examples of anions include inorganic anions such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$ and organic anions such as $HCOO^-$, $(COO^-)^2$, $COOH(COO^-)$, $CH_3COO^-$, $C_2H_4(COO^-)_2$, $C_6H_5COO^-$, $C_6H_4(COO^-)_2$ and $CH_3SO_3^-$. When a polyvalent metal ion is employed for reaction agent, the content ratio (mass %) of the polyvalent metal ion in the reaction liquid as reduced to polyvalent metal salt is preferably not less than 1.00 mass % and not more than 20.00 mass % relative to the total mass of the reaction liquid.

Reaction liquid containing an organic acid can turn the anionic groups that are a component existing in ink into an acid type and causes them to aggregate as it shows a buffering capacity in an acidic region (of less than pH 7.0, preferably of pH between 2.0 and 5.0). Examples of organic acids that can be contained in reaction liquid include monocalboxylic acids such as formic acid, acetic acid, propionic acid, butyric acid, benzoic acid, glycolic acid, lactic acid, salicylic acid, pyrrole carboxylic acid, furan carboxylic acid, picolinic acid, nicotinic acid, thiophene carboxylic acid, levulinic acid and coumalic acid and salts thereof; dicarboxylic acids such as oxalic acid, malonic acid, succinic acid, glutaric acid, adipic acid, maleic acid, fumaric acid, itaconic acid, sebacic acid, phthalic acid, malic acid and tartaric acid and salts and hydrogen salts thereof; tricarboxylic acids such as citric acid and trimellitic acid and salts and hydrogen salts thereof; teteracarboxylic acid such as pyromellitic acid and salts and hydrogen salts thereof. The content ratio (mass %) of the organic acid in reaction liquid is preferably not less than 1.00 mass % and not more than 50.00 mass %.

Examples of cationic polymers that can be used for the purpose of the present invention include polymers having a primary, secondary or tertiary amine structure and polymers having a quaternary ammonium salt structure. More specifically, examples of polymers having any of such structures include polymers having a vinyl amine structure, those having an aryl amine structure, those having a vinyl imidazole structure, those having a vinyl pyridine structure, those having a dimethyl amino ethyl methacrylate structure, those having an ethylene imine structure and those having a guanidine structure. Cationic polymer and an acidic compound may be used in combination and/or cationic polymer may be subjected to a quaternization process in order to improve the solubility of the cationic polymer in reaction liquid. When cationic polymer is employed for reaction agent, the content ratio (mass %) of the cationic polymer in reaction liquid is preferably not less than 1.00 mass % and not more than 10.00 mass % relative to the total mass of the reaction liquid.

(Components Other than Reaction Agent)

Components other than the reaction agent that can be used for ink include aqueous mediums and other similar additives as pointed out earlier.

If necessary, polymer can be added to the reaction liquid to be used for forming images. The polymer to be added to the reaction liquid can be selected from the polymers and polymer micro particles that can be added to ink as will be described hereinafter according to the composition of the reaction liquid.

<Ink Applying Device>

This embodiment of inkjet recording apparatus has an ink applying device for applying ink onto an ink receiving medium. The ink applying device applies ink to the ink receiving medium, to which reaction liquid has already been applied, so as to make the applied ink overlap at least part of the surface region of the transfer body where reaction liquid has been applied. Then, the reaction liquid and the ink are mixed with each other on the ink receiving medium and an ink image is formed by the reaction liquid and the ink. Moreover, the liquid component is absorbed from the ink image by the liquid absorption device.

The ink applying device for applying ink includes an inkjet head for ejecting ink. For example, the mode of operation of the inkjet head may be such that ink is ejected by causing ink to give rise to film boiling by means of an electrothermal transducer and thereby forming bubbles, that ink is ejected by means of an electromechanical transducer or that ink is ejected by utilizing static electricity. Any known inkjet head can be used for this embodiment. Particularly, an inkjet head designed to utilize an electrothermal transducer is preferably employed from the viewpoint of high speed and high density printing. As the ink applying device receives image signals, it applies a required amount of ink to each of the spots that take part in the image drawing operation.

While the amount of ink applied per unit area can be expressed in terms of the density value of the given image data, the thickness of the applied ink or the like, for this embodiment, the amount of ink applied per unit area ($g/m^2$) is expressed by the average value obtained by multiplying the mass of each ink dot by the number of ink application spots and dividing the product of the multiplication by the printed area. The expression of the largest amount of applied ink per unit area is made to refer to the amount of applied ink per unit area at least in an area not less than 5 $mm^2$ within the region to be used as information-carrying region on the ink receiving medium from the viewpoint of removing the liquid component in the applied ink.

The ink applying device may include an inkjet head for ejecting clear ink, which is substantially transparent and does not contain any coloring material or, if it contains a coloring material, it contains the coloring material only to a very small proportion. Then, clear ink may be utilized to form an ink image with reaction liquid and color inks. For instance, such clear ink can be used to improve the glossiness of the drawn image. For this purpose, it is better to appropriately adjust the content ratio of the polymer component to be compounded and additionally control the clear ink ejecting position so as to produce a glossy feeling on the transferred image. Since the ejected clear ink is preferably located at the surface layer side relative to the color inks on the final record, clear ink is applied to the transfer body 101 before the application of color inks in the case of a transfer type recording apparatus. For this purpose, the inkjet head for ejecting clear ink may be arranged at the upstream side as viewed in the moving direction of the transfer body 101 that is located vis-à-vis the ink applying device relative to the inkjet heads for ejecting color inks.

Beside the inkjet head for producing a glossy feeling, such an inkjet head may also be used to improve the performance of transferring an image from the transfer body onto a recording medium. For example, clear ink may be made to contain a component for expressing tackiness more than color inks and applied to the ejected color inks on the transfer body 101. Then, such clear ink can operate as transferability improving liquid when applied onto the transfer body 101. For example, the inkjet head for ejecting clear ink for the purpose of improving the image transferability may be arranged at the downstream side relative to the inkjet heads for ejecting color inks as viewed in the moving direction of the transfer body 101 that is located vis-à-vis the ink applying device. With this arrangement, after color inks are applied onto the transfer body 101, such clear ink is applied onto the transfer body that is already carrying the color inks applied thereto. Then, the applied clear ink is found on the uppermost surface of the ink image formed on the transfer body 101. The clear ink on the surface of the ink image sticks to the recording medium with a certain degree of adhesive force in the operation of transferring the ink image onto the recording medium at the transfer section so that the ink image after liquid removal can easily be moved onto the recording medium.

<Ink>

The components of ink to be used for this embodiment will be described below in detail.

(Coloring Material)

A pigment or a dye can be used as coloring material. The content ratio of the coloring material in ink is preferably not less than 0.5 mass % and not more than 15.0 mass %, more preferably not less than 1.0 mass % and not more than 10.0 mass %, relative to the total mass of ink.

Specific examples of pigments that can be used for ink for the purpose of the present invention include inorganic pigments such as carbon black and titanium oxide and organic pigments based on any of as azo compounds, phthalocyanine, quinacridone, isoindolinone, imidazolone, diketopyrrolopyrrole and dioxazine.

As a technique for dispersing the selected pigment, a polymer-dispersed pigment that uses polymer as dispersant or a self-dispersible pigment in which a hydrophilic group is bonded to the particle surfaces of the pigment may be employed. Alternatively, a polymer-bonded pigment in which a polymer-containing organic group is chemically bonded to the particle surfaces of the pigment or a microencapsulated pigment in which the particle surfaces of the pigment are coated with polymer or the like may be employed.

As polymer-made dispersant for dispersing the pigment in an aqueous medium, a dispersant that can disperse the pigment in an aqueous medium by the action of an anionic group is preferably employed. As polymer-made dispersant, preferably the type of polymer that will be described hereinafter, more preferably water-soluble polymer is employed. The content ratio (mass %) of the pigment is preferably not less than 0.3 times and not more than 10.0 times of the content ratio of the polymer-made dispersant in terms of mass ratio (pigment/polymer-made dispersant).

As self-dispersible pigment, a pigment in which an anionic group such as a carboxylic acid group, a sulfonic acid group or a phosphonic acid group is bonded to the particle surfaces of the pigment directly or by way of some other group of atoms (—R—) can be employed. The anionic group may be either of the acid type or of the salt type. When the anionic group is of the salt type, it may be either in a partly dissociated state or in a totally dissociated state. Examples of cations that can operate as counter ions when the anionic group is of the salt type include alkali metal cations, ammonium and organic ammonium. Specific examples of some other group of atoms (—R—) include straight chain or branched alkylene groups having one to twelve carbon atoms, arylene groups such as phenylene groups and naphthylene groups, carbonyl groups, imino groups, amido groups, sulfonyl groups, ester groups and ether groups. Any of groups obtained by combining two or more of the above-listed groups may also be employed.

Dyes having an anionic group are preferably used for inks to be used for this embodiment. Specific examples of dyes include azo dyes, triphenylmethane dyes, (aza)phthalocyanine, dyes, xanthene dyes and anthrapyridone dyes.

(Polymer)

Ink can be made to contain polymer. The content ratio (mass %) of polymer in ink is preferably not less than 0.1 mass % and not more than 20.0 mass %, more preferably not less than 0.5 mass % and not more than 15.0 mass % relative to the total mass of ink.

Polymer can be added to ink for the reasons including that (i) polymer stabilizes the dispersed state of the pigment in ink as polymer-made dispersant as described above or as an agent for assisting the action of the polymer-made dispersant and that (ii) polymer improves various characteristics of the image to be recorded. Polymer can be used in the form of block copolymer, in the form of random copolymer, in the form of graft copolymer and so on or in the form of a combination of any two or more of them. The polymer to be used may be in a state of being dissolved in an aqueous medium as water-soluble polymer or in a state of being dispersed in an aqueous medium as polymer particles. Such polymer particles may not necessarily encapsulate a coloring material.

For the purpose of the present invention, the expression that polymer is water-soluble means that it does not form particles whose particle size can be measured by means of a dynamic light scattering method when the polymer is neutralized by alkali equivalent to the acid value. If given polymer is water-soluble or not can be determined by means of the method that will be described below. Firstly, liquid containing the polymer (solid polymer: 10 mass %) that has been neutralized by alkali (sodium hydroxide, potassium hydroxide or the like) that corresponds to the acid value of the polymer is prepared. Then, the prepared liquid is diluted with pure water 10 times (in terms of volume) to prepare a sample solution. When the polymer particle size in the sample solution is measured by a dynamic light scattering method, the polymer can be determined to be water-soluble if no particle having a measurable particle size is observed. The conditions of the measurement may, for example, be so selected as to include SetZero: 30 seconds, number of times of measurement: 3 and duration of each measurement: 180 seconds. A particle size analyzer (e.g., "UPA-EX150", trade name, available from Nikkiso) involving the use of a dynamic light scattering method may be used as particle size distribution measurement instrument. Of course, the particle size distribution measurement instrument to be used and the conditions of the measurement are not limited to the above-described ones.

The acid value of the polymer to be used is preferably not less than 100 mgKOH/g and not more than 250 mgKOH/g when the polymer is water-soluble polymer and not less than 5 mgKOH/g and not more than 100 mgKOH/g when the polymer is particulate polymer. The weight average molecular weight of the polymer is preferably not less than 3,000 and not more than 15,000 when the polymer is water-soluble polymer and not less than 1,000 and not more than 2,000,000 when the polymer is particulate polymer. When the polymer particles are measured by means of a dynamic light scattering method (using the conditions of the measurement same as the above-listed ones), the volume average particle size thereof is preferably not less than 100 nm and not more than 500 nm.

Polymers that can be used in ink for the purpose of the present invention include acryl-based polymers, urethane-based polymers and olefin-based polymers, of which acryl-based polymers and urethane-based polymers are preferable.

As acryl-based polymers, polymers having both a hydrophilic unit and a hydrophobic unit as constituent units are preferable. Above all, acryl-based polymers having a hydrophilic unit that is derived from (meth)acrylic acid and a hydrophobic unit that is derived at least either from a monomer having a benzene ring or from a (meth)acrylate-based monomer is preferable. Particularly, polymers having a hydrophilic unit derived from (meth)acrylic acid and a hydrophobic unit derived at least either from a styrene monomer or from an α-methyl styrene monomer are preferable. Because any of such polymers is liable to interact with a pigment, it can suitably be utilized as polymer-made dispersant for dispersing a pigment. A hydrophilic unit has a hydrophilic group such as an anionic group. A hydrophilic unit can typically be formed by polymerizing a hydrophilic monomer having a hydrophilic group. Specific examples of hydrophilic monomers having a hydrophilic group include acidic monomers having a carboxylic acid group such as (meth)acrylic acid, itaconic acid, maleic acid and fumaric acid, anionic monomers that are anhydrates of the above-cited acidic monomers and also anionic monomers that are salts of the above-cited acidic monomers. Examples of cations that constitute salts of acidic monomers include ions of lithium, sodium, potassium, ammonium and organic ammonium. A hydrophobic unit is a unit that does not have any hydrophilic group such as an anionic group. A hydrophobic unit can typically be formed by polymerizing a hydrophobic monomer that does not have any hydrophilic group such as an anionic group. Specific examples of hydrophobic monomers include monomers having an aromatic ring such as styrene, α-methylstyrene, benzyl (meth) acrylate and (meth)acrylate-based monomers such as methyl (meth)acrylate, butyl (meth)acrylate and 2-ethylhexyl (meth)acrylate.

Urethane-based polymers can be formed, for example, by causing polyisocyanate and polyol to react with each other. A chain extender may be added to the reaction system. Examples of olefin-based polymers include polyethylene and polypropylene.

(Aqueous Medium)

Ink may be made to contain water or an aqueous medium, which is a mixture solvent of water and a water-soluble organic solvent. Water to be used for the purpose of the present invention is preferably deionized water or ion exchange water. The content ratio (mass %) of water in aqueous ink is preferably not less than 50.0 mass % and not more than 95.0 mass % relative to the total mass of ink. The content ratio (mass %) of the water-soluble organic solvent in aqueous ink is preferably not less than 3.0 mass % and not more than 50.0 mass % relative to the total mass of ink. Examples of water-soluble organic solvents include alcohols, (poly)alkylene glycols, nitrogen-containing compounds, sulfur-containing compounds and other organic solvents that can be used for inks for inkjet applications.

(Other Additives)

In addition to the above-described components, ink can contain various additives selected from anti-foaming agents, surfactants, pH control agents, viscosity modifiers, rust preventing agents, antiseptics, fungicides, antioxidants and anti-reducing agents.

<Liquid Absorbing Member>

The liquid absorbing member having a porous body of this embodiment is brought into contact with the ink image formed by the embodiment, from which the liquid component thereof has not been removed, in order to absorb at least part of the liquid component and reduce the content ratio of the liquid component in the ink image. The porous body that the liquid absorbing member has includes at least a first layer and a second layer. The first layer in turn has a first surface that is to be brought into contact with an ink image and a second surface (rear surface) that is held in contact with the second layer. Preferably, the liquid absorbing member having such a porous body has a profile that is suited to be driven to move so as to follow the move of the ink receiving medium in an interlocked manner, contact the ink image from which the liquid component thereof has not been removed, then contact another ink image from which the liquid component thereof has not been removed with a predetermined interval so as to be used for a cyclical operation of absorbing the liquid components from the images it contact. Exemplar liquid absorbing members having a profile suited for such repeated use include an endless belt-shaped liquid absorbing member and a drum-shaped liquid absorbing member.

(Porous Body)

The inventors of the present invention found that the thickness of the first layer that the porous body has needs to be not less than 0.08 times of the average pore size of the second layer and hence the requirement of formula 1 shown below needs to be satisfied:

$$T1 \geq (P2\text{ave} \times 0.08), \quad \text{formula 1:}$$

where T1 represents the thickness of the first layer and P2ave represents the average pore size of the second layer.

While the exact mechanism of suppressing changes in the texture of the ink image under the condition that the above-described requirement is satisfied by the porous body is not clear, the inventors proposes a possible mechanism as described below.

As the coloring material and some other sold components of the ink of the ink image are forced to aggregate by the reaction liquid or for some other reason, the apparent viscosity of the ink is raised so that the extent of the deformation of the ink image that occurs when the porous body is brought into contact with the ink image is reduced. To further suppress the deformation of the ink image so as not to damage the texture of the ink image, the porous body is required to be brought into contact with the ink image so as not to deform the ink image that contains the aggregate of the coloring material and some other components. Then, it may be safe to assume that the smaller the unevenness of the stress applied to the surface of the ink image by the porous body, the better.

Figure 1B:
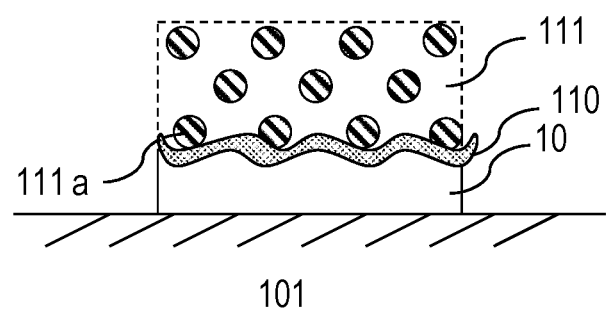
Figure 1C:
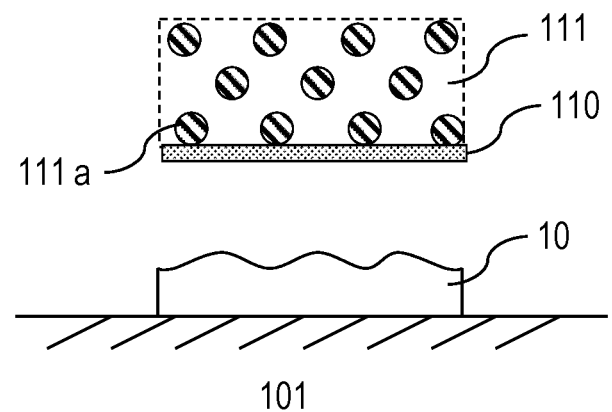

The reason why the texture of the ink image changes when the extent of the stress unevenness is large will be described below by referring to FIGS. 1A through 1C. FIGS. 1A through 1C are partial cross sectional views of an ink image formed on a transfer body, which is an ink receiving medium, and a porous body, illustrating the influence of the fibers contained in the second layer of the porous body on the ink image. FIG. 1A shows the state of the ink image before a porous body is brought into contact with it (the ink image prior to liquid removal), FIG. 1B shows a state of the ink image during the contact of the porous body with the ink image and FIG. 1C shows a state of the ink image when the porous body is moved away from the ink image (the ink image after liquid removal). As seen from FIGS. 1A through 1C, there can be instances where the profiles of the fibers 111a of the second layer that give rise stress unevenness when the porous body having the first layer 110 and the second layer 111 is brought into contact with the ink image 10 prior to liquid removal on the transfer body 101 are transferred onto the ink image. When such a transfer of the profiles of the fibers takes place, surface unevenness of the ink image occur prior to liquid removal and, as such surface unevenness becomes visible or as the glossiness of the surface changes, the texture of the ink image also changes. Additionally, as a result of the research efforts made by the inventors of the present invention, the inventors found that the unevenness produced on the surface of the ink image after liquid removal also influences the surface of the ink image after the image transfer. In short, the ink image keeps the change in the texture of the ink image until after the image transfer. Such surface unevenness that can arise when an ink image prior to liquid removal is turned to an ink image after liquid removal can take place in instances where a recording medium is employed as ink receiving medium.

According to the present invention, the first layer of the porous body is deformed only to a small extent at least when the requirement of the above-described formula 1 is satisfied and hence the unevenness of the stress that is applied to the ink image is reduced. Thus, it may be safe to assume that the change in the texture of the ink image can be suppressed for the above-described reasons.

Additionally, the thickness of the first layer is preferably not more than 2 times of, more preferably not more than, the average pore size of the second layer. When the thickness of the first layer is made to be not more than a predetermined level, the increase of the flow resistance can be suppressed and the influence thereof on the liquid absorbing performance can be minimized. The thickness of the first layer, which is the surface layer of the porous body that is to be brought into contact with an ink image, can be determined by producing a cross section thereof at arbitrarily selected ten positions by means of CT scanning or ion milling, subsequently observing the cross sections through a scanning electron microscope (SEM) to measure the thicknesses at the ten positions and calculating the average of the measured thicknesses.

The average pore size of the first layer of the porous body is preferably not more than 5.0 µm, more preferably not more than 3.0 µm, most preferably not more than 0.6 µm. When the average pore size is not more than 5.0 µm, the unevenness of the stress applied to the ink image prior to liquid removal that is attributable to the profiles of the pores that the first layer has is suppressed to in turn improve the effect of suppressing the change in the texture of the ink image. While the lower limit of the average pore size of the first layer is not subject to any particular limitations, the average pore size of the first layer is preferably, for instance, not less than 0.02 µm. For the purpose of the present invention, "the average pore size" refers to the average diameter that can be measured and calculated by means of the mercury penetration method or the nitrogen adsorption method.

For the purpose of the present invention, the pore size of the first layer can be measured even when one or more layers have been laid on it because the pore size (average pore size) of the first layer is smaller than the thickness of the other layer or any of the other layers. Examples of instruments that can be used for measuring the pore size of the first layer include PORO METER 3G (trade name, available from Quantachrome Instruments Japan).

The arithmetic average roughness Ra of the surface (the first surface of the first layer) of the porous body is preferably not more than 2.0 µm, more preferably not more than 1.0 µm, most preferably not more than 0.4 µm. When the Ra value is not more than 2.0 µm, the stress unevenness that is observed when the porous body is brought into contact with the ink image prior to liquid removal can further be reduced and the amount of the coloring material that adheres to the porous body from the ink image can be reduced. While the lower limit of the Ra value is not subject to any particular limitations, it can typically be made to be not less than 0.2 µm. Note that the arithmetic average roughness Ra is defined according to JIS B 0601:2001.

The surface profile (arithmetic average roughness Ra) of the porous body and that of each of the layers that constitutes the porous body can be observed by synthesizing the data obtained by scanning the reflections in the range of observation/measurement along the Z-axis by means of a laser microscope (e.g., a semiconductor laser of wavelength of about 405 nm) using a confocal optical system typically including a pin hole.

The arithmetic average roughness Ra is measured specifically by means of the method as described below.

Data from the surface down to a depth of 200 µm are obtained in a RPD mode by means of a VK9710 laser microscope (trade name, available from Keyence) and through an objective lens of 50 times (CF IC EPI PLAN Apo 50X: trade name, available from Nikon). Then the obtained data are subject to noise (median) filtering and the surface roughness is computationally determined with a cutoff length $\lambda c$ of 0.08 µm for a sampled standard length of 200 µm.

As described earlier, the unevenness of the stress applied to the surface of the ink image by the porous body is suppressed and the change in the texture of the ink image is also suppressed presumably when the thickness of the first layer and the average pore size of the second layer satisfy the requirement of the formula 1. The average pore size of the second layer is computationally determined by observing the surface of the second layer through a scanning electron microscope (SEM) and picking up pores at arbitrarily selected ten positions or by using the same method after observing the surface of the second layer by CT scanning.

The Gurley value of the porous body is observed by means of a Gurley tester defined by JIS P 8117. The Gurley value of the porous body of an inkjet recording apparatus according to the present invention is preferably not more than 10 seconds, more preferably not more than 5, most preferably not more than 3 seconds. When the Gurley value is not more than 10 seconds, presumably the flow resistance falls so that the liquid component contained in the ink image can satisfactorily be absorbed and removed within the contact time of the porous body to suppress the image smearing, if any. While the lower limit of the Gurley value is not subject to any particular limitations, it may typically be not more than 1 second. The lower the Gurley value, the higher the gas permeability and the liquid permeability. The Gurley value can typically be reduced by making the first layer show a small thickness in the operation of forming the first layer in a manner as described hereinafter before using the first layer for the porous body. In particular, to make the first layer uniformly show a high degree of gas permeability, the thickness of the first layer of the porous body is preferably not more than 60 µm, more preferably not more than 40 µm.

On the other hand, the thickness of the first layer is preferably not less than 1 µm from the viewpoint of improving the handling feasibility at the time of forming a multilayer structure for the porous body.

The compressive modulus of the first layer in the thickness direction is preferably between 0.2 and 5 MPa, more preferably between 0.4 and 2 MPa, in a state of being crushed to about 20% from the viewpoint of image tracking performance and suppression of stress unevenness. The compressive modulus of the first layer is measured by using a means of observing a cross section of the first layer, while applying pressure to it, or by means of a popular compressive modulus measurement instrument.

Figure 2A:
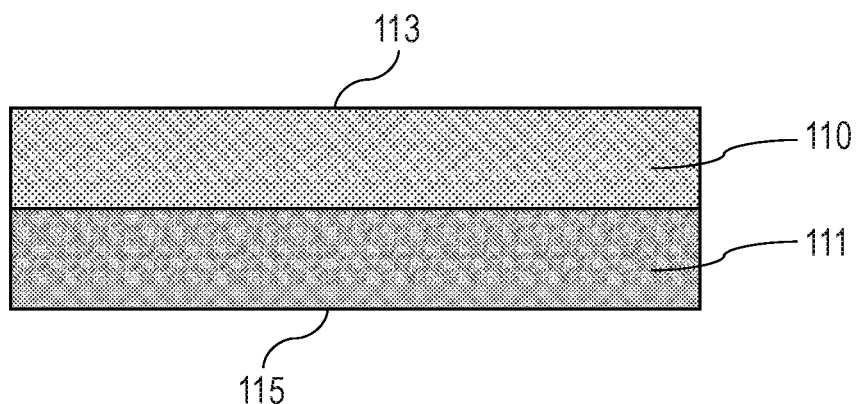
FIGS. 2A and 2B are schematic cross sectional views of the porous body included in the liquid absorbing member, showing the structure of the porous body.
Figure 2B:
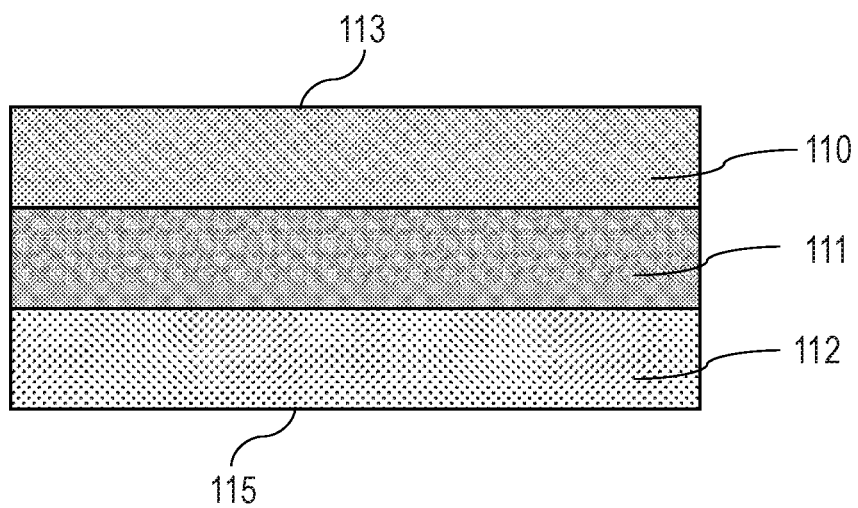

FIGS. 2A and 2B show exemplar multilayer structures that can be used for the porous body. FIG. 2A is a schematic cross-sectional view of a porous body having a two-layered structure. FIG. 2B is a schematic cross-sectional view of a porous body having a three-layered structure. When the porous body has a structure formed by a first layer 110 and a second layer 111 as shown in FIG. 2A, the surface that is brought into contact with an ink image prior to liquid removal is the surface 113 of the first layer (the first surface of the first layer). The rear surface relative to the surface 113 of the first layer (the second surface of the first layer) is held in contact with the second layer 111. The rear surface 115 of the second layer relative to the surface that contacts the first layer is the rear surface of the porous body opposite to the surface that contacts an ink image. The porous body preferably has a third layer that is a support layer, which will be described in greater detail hereinafter. More preferably, as shown in FIG. 2B, the porous body preferably has the first layer 110, the second layer 111 and the third layer 112 arranged in the above-mentioned order. The porous body may additionally have another layer arranged on the third layer.

So long as the advantages of the present invention is secured, the porous body may further has one or more additional layers arranged between the second layer and the third layer and/or between the third layer and the layer arranged on the third layer. For the purpose of the present invention, it is sufficient for the porous body that the porous body is made of a material having a large number of pores. For example, a material having a large number of pores and formed by fibers that cross each other, namely that are interwoven, can also be used for the porous body.

Now, an embodiment of porous body will be described below.

[First Layer]

For this embodiment, the material of the first layer is not subjects to any particular limitations. More specifically, a material selected from hydrophilic materials showing a contact angle of less than 90° relative to water and water-repellent materials showing a contact angle of not less than 90° relative to water can be used for the porous body.

When a hydrophilic material is to be used for the first layer, it is preferably selected from single materials such as cellulose and polyacrylamide and composite materials formed by using such single materials. Alternatively, any of the water-repellent materials that are listed below and whose surfaces are treated for hydrophilization can also be used for the first layer. Techniques that can be used for the hydrophlization treatment include sputter-etching, radiation exposure, $H_2O$ ion irradiation and excimer (UV) laser beam irradiation.

When a hydrophilic material is to be used for the first layer, it more preferably shows a contact angle of not more than 60° relative to water. A hydrophilic material provides an advantage of sucking up liquid, water in particular, by its capillary force.

On the other hand, from the viewpoint of improving the cleaning performance for suppressing adhesion of coloring materials, the material of the first layer is preferably a water-repellent material showing a low surface free energy level, fluorine-containing polymer in particular. Specific examples of fluorine-containing polymers include polytetrafluoroethylene (PTFE), polychlorotrifluoroethylene (PCTFE), polyvinylidene fluoride (PVDF), polyvinyl fluoride (PVF), perfluoroalkoxy fluoropolymer (PFA), tetrafluoroethylene-hexafluoropropylene copolymer (FEP), ethylene-tetrafluoroethylene copolymer (ETFE) and ethylene-chlorotrifuloroethylene copolymer (ECTFE). If necessary, one, two or more of these polymers may be used for the purpose of the present invention. A plurality of films may be laid one on the other in the first layer. When a water-repellent material is to be used for the first layer, the selected material may not provide any effect of sucking up liquid by capillary force and there can be instances where the first layer made of such a material takes time to suck up liquid when it is brought into contact with an ink image for the first time. To solve this problem, preferably liquid whose contact angle relative to the first layer is less than 90° is made to penetrate into the first layer in advance. Such liquid can be made to penetrate into the first layer by applying it from the first layer of the liquid absorbing member. Preferably, such liquid is prepared by mixing a surfactant or a liquid showing a low contact angle relative to the first layer with water.

The first layer can be prepared by any known method of manufacturing thin porous film. For example, such film can be obtained by forming a sheet-shaped object of a polymer material typically by means of extrusion molding and subsequently stretching the sheet-shaped object to make it show a predetermined thickness. Then, the first layer can be obtained as porous film by adding a plasticizer such as paraffin to the material at the time of extrusion molding and removing the added plasticizer typically by heating at the time of stretching. The pore size can be adjusted by appropriately adjusting the rate at which the plasticizer is added and the stretch ratio.

[Second Layer]

In this embodiment, the second layer is preferably a layer showing gas permeability. For example, the second layer may be made of non-woven fabric or woven fabric of polymer fibers. While the material of the second layer is not subject to any particular limitations, it is preferably a material that shows a contact angle relative to the liquid to be absorbed that is equal to or lower than the material of the first layer. Such a material is preferably selected, for example, from single materials such as polyolefin (polyethylene (PE), polypropylene (PP) etc.), polyurethane, polyamide such as nylon, polyester (polyethyleneterephthalate (PET) etc.), polysulfone (PSF) and so on and composite materials obtained by using any of the above-listed single materials. Preferably, the second layer is a layer whose pore size is greater than the pore size of the first layer. The average fiber diameter of the second layer is preferably not less than 3 µm and not more than 20 µm, more preferably not less than 5 µm and not more than 15 µm from the viewpoint of suppressing the unevenness of the stress that is applied to the image and improving the handling feasibility. For the purpose of the present invention, the average fiber diameter is the average value obtained by observing the fibers from the surface of the layer through a scanning electron microscope (SEM) or preparing a cross section of the layer by means of ion milling or FIB and observing the cross section through a SEM and measuring the diameter of 20 fibers in the obtained image and calculating the average value.

Note that the average pore size of the second layer is preferably not less than 6 μm and not more than 200 μm, more preferably not less than 10 μm and not more than 80 μm.

The thickness of the second layer is preferably not less than 5 μm and not more than 100 μm, more preferably not less than 10 μm and not more than 50 μm from the viewpoint of suppressing the flow resistance and improving the handling feasibility.

The arithmetic average roughness Ra as defined in JIS B 0601:2001 of the surface of the second layer at the side of the first layer is preferably not more than 10 μm, more preferably not more than 6 μm, most preferably not more than 4 μm. When the Ra value is not more than 10 μm, the first layer is not liable to be deformed so that presumably adhesion of any coloring material can hardly take place.

When the first layer and the second layer are to be tightly bonded to each other by heating, preferably each of the layers is made of a thermoplastic resin material and the combination of the first material for forming the first layer and the second material for forming the second layer are selected so as to make their respective softening points show a clear difference. More specifically, the absolute value (|ΔSp|) of the difference (ΔSp=Sp1−Sp2) between the softening point (Sp1) of the first material and the softening point (Sp2) of the second material is preferably not less than 10° C., more preferably not less than 20° C., most preferably not less than 40° C. It may be safe to assume that, when |ΔSp| is not less than 10° C., the area in which the two materials are partially melted is limited so that suppression of the rise of the flow resistance and improvement of the adhesion strength become compatible. Note that, while the upper limit of |ΔSp| is not subject to any particular limitations, it may typically be 200° C. Also note that a single material or two or more materials may be used for each of the first material and the second material provided that the requirement of the difference between the softening points of the two materials is satisfied. In the heat lamination process using two materials that show such a difference of softening points, the tightly adhering area of the material for forming the first layer and the material for forming the second material can effectively be limited by heat treating the two materials at the lower softening point.

To provide the second layer with a plurality of features or characteristics necessary to achieve the objective of the present invention such as the contact angle of the fiber surface relative to water, the strength of the fiber itself, the fixing strength among fibers and porosity, fibers having a core-sheath structure, which is a composite material produced by using two materials, is preferably employed for forming the second layer. It is preferable to use fibers having a core-sheath structure, of which the core and the sheath show different melting points or different softening points, from the viewpoint of limiting the area where the materials adhere to each other when the two materials are melted and obtaining an intended fiber diameter. A material showing the softening point (Sp2) of the above-described second material is preferably employed for the material for forming the sheath. The first layer and the second layer can more effectively be tightly bonded to each other by making the softening point (Sp2) of the material for forming the sheath lower than the softening point (Sp3) of the material for forming the core and the softening point (Sp1) of the material for forming the first layer and selecting a temperature that is higher than Sp2 and lower than Sp 1 and Sp3 for causing the first layer and the second layer to be tightly bonded to each other by means of heat treatment.

When the above-described requirements are satisfied, the bonding spots for bonding the first layer and the second layer can be made smaller and the intervals separating the bonding spots can be reduced to improve both the gas permeability and the adhesion strength of the two layers.

(Third Layer)

In this embodiment, the porous body having a multilayer structure preferably has three or more layers. The third layer and the succeeding layer or layers are preferably made of non-woven fabric from the viewpoint of rigidity. The conveyance strength of the porous body is improved when the porous body has a highly rigid third layer.

Materials similar to those of the second material can also be used for the third layer. The use of a porous body including a third layer made of fibers that also have a core-sheath structure, of which the melting point of the core differs from the melting point of the sheath is preferable in order to limit the area where the materials adhere to each other when they are melted.

[Other Materials]

The liquid absorbing member may have a reinforcement member for reinforcing the lateral surfaces of the liquid absorbing member in addition to the porous body having a multilayer structure as described above. Additionally, when the liquid absorbing member has two or more long sheet-shaped porous bodies that are to be coupled to each other to produce a belt shaped liquid absorbing member, the liquid absorbing member may have one or more coupling members to be used to couple the sheet-shaped porous bodies at their longitudinal ends. A non-porous tape can be used as the material of such one or more coupling members. When a single coupling member is to be used, it may be arranged at a position where it does not contact the ink image. When two or more coupling members are to be used, they may be arranged at positions where they do no contact the ink image or cyclically so as not to contact the ink image.

[Porous Body Manufacturing Method]

The method to be used for forming a porous body by laying the second layer on the first layer is not subject to any particular limitations. The second layer may simply be laid on the first layer or, alternatively, the second layer may be bonded to the first layer by means of adhesive lamination or heat lamination. However, for this embodiment, the use of heat lamination is preferable from the viewpoint of gas permeability. For example, the first layer and the second layer may be bonded each other after melting part of the first layer or the second layer. Still alternatively, a fusion bonding agent such as hot melt powder may be interposed between the first layer and the second layer and heated so as to put the second layer on the first layer and bond the second layer to the first layer. When a third layer and succeeding layer or layers are to be laid further, all the layers may be laid one on the other at a time or they may sequentially be laid one on the other. The order in which these layers are laid may appropriately be selected. The use of a lamination method is preferable for the heating process. With a lamination method, the porous body is pinched between a pair of heated rollers and heated, while applying pressure to the porous body by the rollers.

Now, an inkjet recording apparatus according to the present invention will be described by way of specific embodiments. An inkjet recording apparatus according to the present invention can be provided as either of the two apparatus that will be described below.

(A) an inkjet recording apparatus designed to form an ink image (first image) on a transfer body, which operates as ink receiving medium, prior to liquid removal and, after removing the liquid from the ink image by means of a liquid absorbing member, transfer the ink image (second image) onto a recording medium.

(B) an inkjet recording apparatus designed to form an ink image on a recording medium, which operates as ink receiving medium, and absorb, on the recording medium, liquid from the ink image (first image) prior to liquid removal by means of a liquid absorbing member.

For the purpose of the present invention and for the sake of convenience, the former inkjet recording apparatus is referred to as transfer type inkjet recording apparatus and the latter inkjet recording apparatus is referred to as direct drawing type inkjet recording apparatus.

Now, each of the inkjet recording apparatus of the two types will be described below.

(Transfer Type Inkjet Recording Apparatus)

In a transfer type inkjet recording apparatus, the ink receiving medium is a transfer body for temporarily holding an ink image prior to liquid removal (a first image) and an ink image after liquid removal that is obtained by removing at least part of the liquid component of the ink of the ink image prior to liquid removal (a second image). Additionally, a transfer type inkjet recording apparatus includes a transfer section having a transfer unit that is equipped with a pressing member to be used for transferring an ink image after liquid removal onto a recording medium where an image is to be formed, which is a final image serving for the objective of a recording operation is to be formed.

Figure 3:
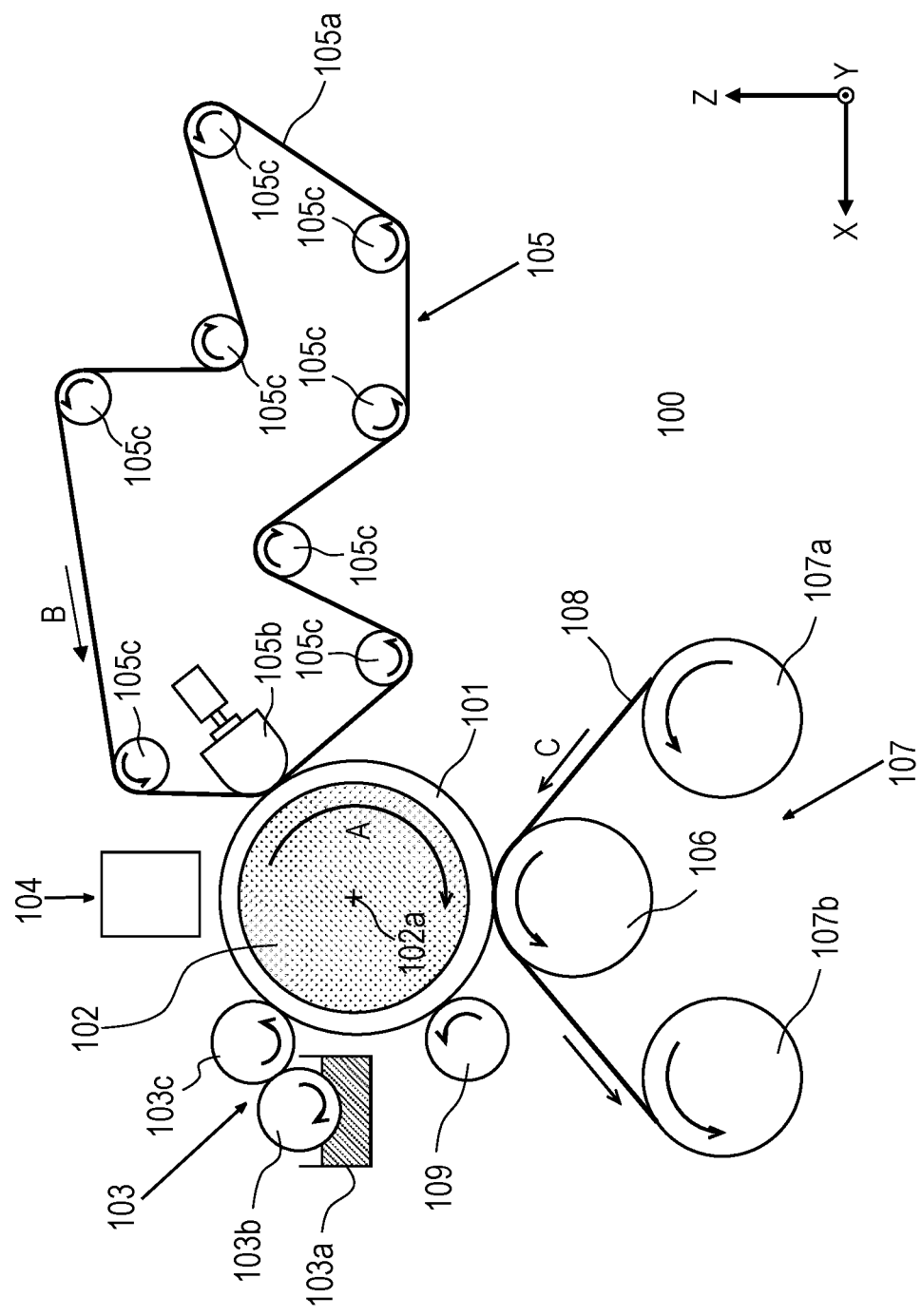
FIG. 3 is a schematic illustration of an exemplar configuration of an embodiment of the present invention, which is a transfer type inkjet recording apparatus.

FIG. 3 is a schematic illustration of an exemplar configuration of the transfer type inkjet recording apparatus 100 of this embodiment.

The illustrated transfer type inkjet recording apparatus includes a transfer unit that includes a transfer body 101 supported by a support member 102, a reaction liquid applying device 103, an ink applying device 104, a liquid absorption device 105 and a pressing member 106 for image transfer.

In the following description of this embodiment, the X-direction, the Y-direction and the Z-direction respectively refer to the width direction (full length direction), the transversal direction and the height direction. Recording medium 108 is conveyed in the direction indicated by arrow C and then conveyed in the X-direction at the time of the image transfer operation.

Reaction liquid is applied onto the transfer body 101 by the reaction liquid applying device 103 and then ink is applied onto the transfer body 101, onto which reaction liquid has already been applied, by the ink applying device 104 to form an ink image prior to liquid removal on the transfer body 101. As the liquid component is absorbed from the ink image on the transfer body 101 prior to liquid removal by the liquid absorption device 105, the ink image is turned to an ink image after liquid removal. The ink image after liquid removal on the transfer body 101 is then transferred onto a recording medium 108, which may typically be a sheet of paper, by the transfer unit that includes the pressing member 106.

The transfer type inkjet recording apparatus 100 may additionally include a transfer body cleaning member 109 which, if necessary, cleans the surface of the transfer body 101 after the operation of transferring the ink image on it onto a recording medium.

The transfer body 101, the reaction liquid applying device 103, the inkjet head of the ink applying device 104, the liquid absorption device 105 and the transfer body cleaning member 109 have respective lengths in the Y-direction that accommodate the recording mediums 108 to be used.

The support member 102 is driven to rotate around the axis of rotation 102a in the sense indicated by arrow A in FIG. 3. As the support member 102 is driven to rotate, the transfer body 101 is forced to move accordingly. Application of reaction liquid by the reaction liquid applying device 103 and application of ink by the ink applying device 104 are sequentially executed on the moving transfer body 101 to form an ink image prior to liquid removal on the transfer body 101. The ink image formed on the transfer body 101 is moved by the moving transfer body 101 to the position where the ink image contacts the liquid absorbing member 105a that the liquid absorption device 105 has. The liquid absorbing member 105a of the liquid absorption device 105 is moved in synchronism with the transfer body 101 and conveyed in the direction indicated by arrow B to get into a state where the ink image contacts the liquid absorbing member 105a. In this state, the liquid absorbing member 105a removes the liquid component from the ink image.

The liquid component is removed in a state where the ink image contacts the liquid absorbing member 105a as described above and, during this operation, the liquid absorbing member 105a preferably contacts the ink image under pressure of a predetermined pressure level from the viewpoint of making the liquid absorbing member 105a effectively operate to achieve the objective of the apparatus.

According to the present invention, when the porous body that the liquid absorbing member 105a has satisfies the requirement of the above-described formula 1, any change in the texture of the formed ink image can be suppressed presumably because the first layer of the porous body is deformed only minimally and the unevenness of the stress applied to the ink image is made small when the porous body is brought into contact with the ink image prior to liquid removal.

The removal of the liquid component can be expressed from a different point of view as concentrating the ink constituting the image formed on the transfer body (ink receiving medium). Concentrating the ink means that the proportion of the solid component contained in the ink, such as coloring material and resin, with respect to the liquid component contained in the ink increases owing to reduction in the liquid component.

The ink image from which the liquid component has been removed is then moved to the transfer section where the ink image contacts a recording medium by the move of the transfer body 101 and is then transferred onto the recording medium as it is brought into contact with the recording medium that has been conveyed to the transfer section by the recording medium conveying device 107. The image that has been transferred onto the recording medium 108 is a mirror-reversed image of the ink image.

Since ink is applied onto the transfer body to form an image after reaction liquid is applied onto the transfer body, the reaction liquid applied to the non-image region of the transfer body is left there without reacting with ink. In the apparatus of this embodiment, the liquid absorbing member 105a contacts not only the image but also the unreacted reaction liquid and removes the unreacted reaction liquid and hence the liquid component contained in the unreacted reaction liquid.

Thus, while the expression that "the liquid component is removed from the image" is used in the above description, the expression is not limitatively applicable to the operation of removing the liquid component from the image but means at least the liquid component is removed from the image on the transfer body when reaction liquid is used with ink. Therefore, for example, it is possible to remove the liquid component in the reaction liquid applied to the region outside of the ink image along with the liquid component in the ink image.

The expression of the liquid component as used herein is not subject to any particular limitations so long as it does not have any definite form and is fluid but has a substantially constant volume.

The expression of the liquid component encompasses water and organic solvent contained in ink, reaction liquid itself as well as water and organic solvent contained in reaction liquid. When reaction liquid is employed with ink, the liquid component is at least partly removed from the surface of the transfer body by the liquid absorbing member.

When the ink image prior to liquid removal contains clear ink as described above, the ink applied onto the transfer body can be concentrated by way of the liquid absorption process. For example, when clear ink is applied onto the color ink that contains a coloring material and has been applied onto the transfer body 101, clear ink may exist over the entire surface of the ink image prior to liquid removal. Or clear ink may exist locally at a spot or a plurality of spots on the surface of the ink image prior to liquid removal and only color ink may exist in the remaining area of the surface of the ink image. At the spot or spots where clear ink exists on the color ink of the ink image, the porous body absorbs the liquid component of the clear ink on the surface of the ink image so that the liquid component of the clear ink is moved. Then, as the liquid component in the color ink is also moved to the porous body, the liquid component in the color ink is also absorbed. When clear ink and color ink coexist in a mixed state on the surface of the ink image, both the liquid component of the color ink and that of the clear ink are moved to the side of the porous body and hence they are absorbed by the porous body. The clear ink to be used for forming the ink image may be made to contain a component that improves the performance of the image transfer from the transfer body 101 to the recording medium to a large extent. For example, the content ratio of the component that, when heated, raises the viscosity of the clear ink more than the viscosity of the color ink may be made to be high.

Now, the components of the transfer type inkjet recording apparatus of this embodiment will be described below.

<Transfer Body>

The transfer body 101 has a surface layer that includes an ink image forming surface. While any of various materials including polymeric materials and ceramic materials may be employed for the transfer body 101, a material showing a high compressive modulus is preferably employed as the material of the transfer body 101 from the viewpoint of durability and other factors. Specific examples of materials that can be used for the transfer body 101 include acrylic polymer materials, acrylic silicone polymer materials, fluorine-containing polymer materials and condensates obtained by condensing hydrolysable organic silicon compounds. The transfer body 101 may be subjected to a surface treatment for its operation in order to improve the wettability relative to reaction liquid and the image transferability and other properties thereof. Surface treatments that can be used for the transfer body 101 include frame processing, corona treatment, plasma treatment, polishing treatment, roughening treatment, active energy ray irradiation treatment, ozone treatment, surfactant treatment and silane coupling treatment. Two or more of the above-described treatment techniques may be used in combination. The surface layer may be made to show any desired surface profile.

The transfer body preferably has a compressible layer that functions to absorb pressure fluctuations. When a compressible layer is provided, it absorbs deformations and disperses local pressure fluctuations to make the transfer body show an excellent transferability even when the transfer body is operated for high speed printing. Examples of materials that can be used for the compressible layer include acrylonitrile-butadiene rubber, acrylic rubber, chloroprene rubber, urethane rubber and silicone rubber. For molding the selected rubber material, preferably, a vulcanizing agent, a vulcanization accelerator or the like is compounded by a predetermined compounding ratio and additionally, if necessary, one or more filler agents selected from a foaming agent, hollow fine particles, table salt and the like are compounded to make the compressible layer porous. As a result of such an arrangement, the foam part is compressed to change its volume in response to various pressure fluctuations so as to make the transfer body less deformable in all directions except the compressing direction and stably secure the excellent transferability and the excellent durability of the transfer body. Porous rubber materials include those having a continuous structure in which the pores are continuously arranged and those having an independent pore structure in which independent pores are arranged. Porous rubber having either of the above structures may be used for the purpose of the present invention. Alternatively, the two structures may be used in combinations.

Preferably, the transfer body has an elastic layer arranged between the surface layer and the compressible layer. Examples of materials that can be used for the elastic layer include polymer materials and ceramic materials. While any of these materials can appropriately be used for the purpose of the present invention, a material selected from various elastomer materials and rubber materials may preferably be used for the elastic layer from the viewpoint of desirable processing characteristics. Specific examples of such materials include fluorosilicone rubber, phenyl silicone rubber, fluorine rubber, chloroprene rubber, urethane rubber, nitrile rubber, ethylene propylene rubber, natural rubber, styrene rubber, isoprene rubber, butadiene rubber, ethylene/propylene/butadiene copolymer and nitrile butadiene rubber, of which silicone rubber, fluorosilicone rubber and phenyl silicone rubber are particularly preferable from the viewpoint of dimensional stability and durability because they show compression set only to a small extent. They are also preferable from the viewpoint that they show only a small change in the modulus of elasticity if the ambient temperature changes and also from the viewpoint of transferability.

Any of various adhesive agents or double sided sticky tapes may be used between the component layers (the surface layer, the elastic layer and the compressible layer) of the transfer body in order to securely maintain the layers in position. One or more reinforcement layers showing a high compressive modulus may be arranged in order to suppress the lateral elongation of any of the layers in the operation of mounting the transfer body in the inkjet recording apparatus and maintain the resilience of the transfer body. Woven fabric may be used for the reinforcement layer or layers. The transfer body can be prepared by appropriately combining the above-described layers formed by using the above-described materials.

The size of the transfer body can freely and appropriately be selected and determined so as to match the size or sizes of the printed images to be formed. The shape of the transfer body is not subject to any particular limitations. As specific examples of the shape of the transfer body, it may be sheet-shaped, roller-shaped, belt-shaped or endless web-shaped.

<Support Member>

The transfer body 101 is supported on the support member 102. The transfer body may be supported on the supporting member 102 by means of any of various adhesive agents and double-sided sticky tapes. Alternatively, an installation assisting member that is typically made of a metal, ceramic or polymer material may be fitted to the transfer body and the transfer body may be supported by the support member 102 by way of the installation assisting member.

The support member 102 is required to show a certain degree of structural strength from the viewpoint of conveyance accuracy and durability. Preferable materials to be used for the support member include metal materials, ceramic materials and polymer materials. Particularly preferable materials include aluminum, iron, stainless steel, acetal resin, epoxy resin, polyimide, polyethylene, polyethylene terephthalate, nylon, polyurethane, silica ceramics and alumina ceramics from the viewpoint of reducing the inertia in operation and improving the control responsiveness in addition to rigidity and dimensional accuracy necessary for withstanding the pressure applied thereto during transfer operations. Two or more of the above-listed materials may preferably be used in combination.

<Reaction Liquid Applying Device>

This embodiment of transfer type inkjet recording apparatus includes a reaction liquid applying device 103 for applying reaction liquid to the transfer body 101.

As reaction liquid is brought into contact with ink, the fluidity of part of the ink and/or the ink composition on the transfer body is reduced to in turn suppress the appearance of the phenomenon of bleeding and that of beading during the image forming operation using ink. More specifically, as the reaction agent (to be also referred to as ink viscosity increasing component) contained in reaction liquid is brought into contact with the coloring material and the polymer that are so many components of the composition of the ink being used, the reaction agent chemically reacts with the coloring material and the polymer or physically adsorbs the coloring material and the polymer. Then, as a result, there arises an overall increase of the ink viscosity or a local increase of the ink viscosity due to aggregation of some of the ink components such as the coloring material to in turn lower the fluidity of part of the ink and/or the ink composition.

The reaction liquid applying device 103 shown in FIG. 3 is a gravure offset roller that includes a reaction liquid container 103a for containing reaction liquid and reaction liquid applying members 103b and 103c for applying the reaction liquid in the reaction liquid container 103 onto the transfer body 101.

<Ink Applying Device>

The inkjet recording apparatus of this embodiment includes an ink applying device 104 for applying ink to the transfer body 101. The reaction liquid and the ink that are applied to the transfer body 101 are mixed with each other on the transfer body 101 and an ink image is formed by the reaction liquid and the ink. Moreover, the liquid component is absorbed from the ink image by the liquid absorption device 105.

In this embodiment, the inkjet head is a full line head extending in the Y-direction and its nozzles are arranged within a range that covers the entire width of the image recording regions of recording mediums of the largest size that can be used with this embodiment. The inkjet head has an ink ejection surface at the lower surface thereof (located at the side of the transfer body 101) where nozzles are open. The ink ejection surface is located vis-à-vis the surface of the transfer body 101 with a minute gap (of about several millimeters) interposed between them.

The ink applying device 104 may include a plurality of inkjet heads for the purpose of applying color inks of different colors onto the ink receiving medium. For example, when yellow ink, magenta ink, cyan ink and black ink are used to form images of the above-listed colors, the ink applying device 104 is made to include four inkjet heads for ejecting respective inks of the four different colors on the ink receiving medium. The four inkjet heads are so arranged as to be aligned in the X-direction.

The ink applying device may include an inkjet head that ejects clear ink, which is described earlier. In the transfer type recording apparatus of this embodiment, clear ink is applied to the transfer body 101 before the application of color inks. For this purpose, the inkjet head for ejecting clear ink may be arranged at the upstream side as viewed in the moving direction of the transfer body 101 that is located vis-à-vis the ink applying device 104 relative to the inkjet heads for ejecting color inks.

Beside the inkjet head for producing gloss, such an inkjet head may be used to improve the performance of transferring an image from the transfer body 101 onto a recording medium. For example, the inkjet head for ejecting clear ink for the purpose of improving the image transferability may be arranged at the downstream side relative to the inkjet heads for ejecting color inks as viewed in the moving direction of the transfer body 101 that is located vis-à-vis the ink applying device 104. With this arrangement, after color inks are applied onto the transfer body 101, such clear ink is applied onto the transfer body that is already carrying the color inks applied thereto. Then, the applied clear ink is found on the uppermost surface of the ink image formed on the transfer body 101. The clear ink on the surface of the ink image sticks to the recording medium 108 with a certain degree of adhesive force in the operation of transferring the ink image onto the recording medium at the transfer section so that the ink image can easily be moved onto the recording medium 108 after the removal of reaction liquid.

<Liquid Absorption Device>

In this embodiment, the liquid absorption device 105 has a liquid absorbing member 105a and a pressing member 105b for pressing the liquid absorbing member 105a against the ink image on the transfer body 101 for the purpose of liquid absorption. The profile of the liquid absorbing member 105a and that of the pressing member 105b are not subject to any particular limitations. For example, as shown in FIG. 3, the pressing member 105b may be cylindrical column-shaped and the liquid absorbing member 105a may be belt-shaped so that the belt-shaped liquid absorbing member 105a may be pressed against the transfer body 101 by the cylindrical column-shaped pressing member 105b.

Figure 4:
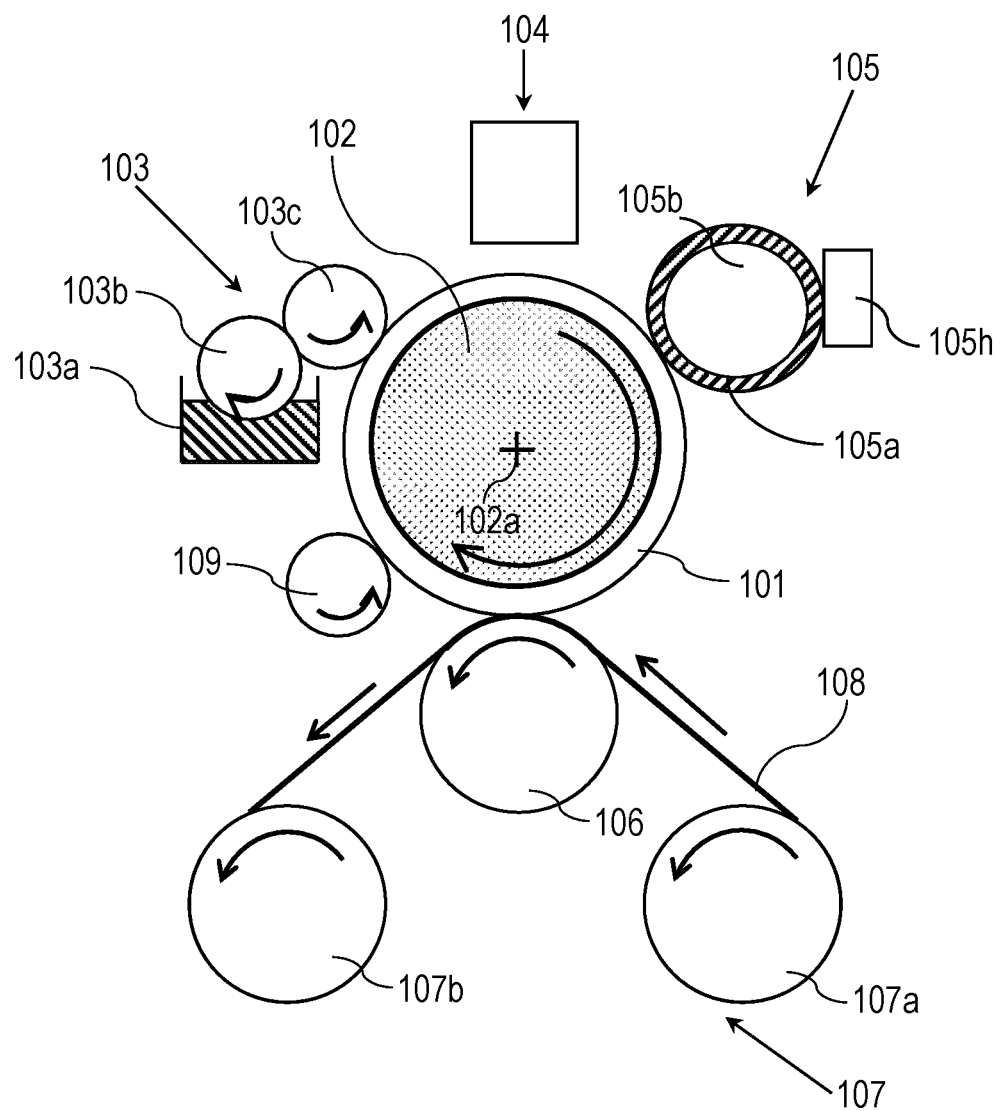
FIG. 4 is a schematic illustration of another exemplar configuration of the embodiment of the present invention, which is a transfer type inkjet recording apparatus.

Alternatively, as shown in FIG. 4, the pressing member 105b may be of cylindrical column-shaped and the liquid absorbing member 105a may be hollow cylinder-shaped and formed on the outer periphery of the cylindrical column-shaped pressing member 105b so that the hollow cylinder-shaped liquid absorbing member 105a may be pressed against the transfer body by the cylindrical column-shaped pressing member 105b. In the latter case, the liquid absorption device preferably additionally has a liquid collecting member 105h that is held in contact with the surface of the liquid absorbing member 105a in order to collect the liquid removed from the ink image. The liquid collecting member 105h may not necessarily be held in contact with the surface of the liquid absorbing member 105a but preferably the liquid collecting member 105h is held in contact with the rear surface of the liquid absorbing member 105a and operates also as the pressing member 105b.

Considering the limited space in the inkjet recording apparatus of this embodiment, the liquid absorbing member 105a is preferably belt-shaped.

The liquid absorption device 105 having such a belt-shaped liquid absorbing member 105a may additionally have stretching members for stretching the liquid absorbing member 105a. In FIG. 3, 105c denotes stretching rollers, which are so many stretching members. While the pressing member 105b is shown as a roller-shaped member that rotates just like the stretching rollers in FIG. 3, the profile of the pressing member 105b is by no means limited to such a shape.

At the liquid absorption device 105, the liquid absorbing member 105a having a porous body is brought into contact with and pressed against the ink image on the transfer body by the pressing member 105b to cause the liquid absorbing member 105a to absorb and reduce the liquid component contained in the ink image. The above-described technique of causing the liquid absorbing member to contact the ink image and reduce the liquid component contained in the ink image may be combined with one or more other known techniques such as a heating technique, a technique of blowing low humidity air and a pressure reduction technique. Additionally, any of the above-listed techniques may be used to further reduce the liquid component of the ink image after the above-described liquid removing operation of reducing the liquid component of the ink image.

Now, the operating conditions and the configuration of the liquid absorption device 105 will be described in detail below.

(Pretreatment)

In this embodiment, a pretreatment of applying a treatment liquid to the porous body that the liquid absorbing member 105a has is preferably executed by means of a pretreatment means (not shown in FIGS. 3 and 4) prior to the operation of causing the liquid absorbing member 105a that has the porous body to contact the ink image on the transfer body. The treatment liquid to be used for the porous body in this embodiment preferably contains water and a water-soluble organic solvent. Water to be used for the treatment liquid is preferably deionized water that is deionized typically by way of ion exchange. The type of the water-soluble organic solvent is not subject to any particular limitations and any known organic solvent such as ethanol or isopropyl alcohol can be used for the pretreatment. With regard to the pretreatment for the liquid absorbing member of this embodiment, while the technique to be used to apply the treatment liquid is not subject to any particular limitations, the use of an immersion technique or a technique of dropping liquid droplets is preferable.

(Pressurizing Conditions)

At the time of causing the liquid absorbing member to contact the ink image on the transfer body, the pressure of the liquid absorbing member is preferably not lower than 2.9 N/cm$^2$ (0.3 kgf/cm$^2$) because solid-liquid separation can be realized in and the liquid component can be removed from the ink image in a short period of time under pressure of such a pressure level. In this specification, the expression of the pressure of the liquid absorbing member refers to the nip pressure between the ink receiving medium and the liquid absorbing member, which is to be determined by observing the surface pressure by means of a surface pressure distribution measurement instrument ("I-SCAN": trade name, available from Nitta) and dividing the load in the pressurized region by the area of the pressurized region.

(Duration of Operation)

The duration of the operation of holding the liquid absorbing member 105a in contact with the ink image is preferably not more than 50 ms in order to suppress any possible adhesion of the coloring material in the ink image to the liquid absorbing member. In this specification, the duration of operation is determined by dividing the pressure sensing width in the moving direction of the ink receiving medium as observed in the above-described surface pressure measurement by the moving speed of the ink receiving medium. The duration of operation is referred to as liquid absorption nip time hereinafter.

Thus, an ink image from which the liquid component has been absorbed and the liquid component of the ink image has been reduced is formed on the transfer body 101 in the above-described manner. The ink image after the liquid removal is then transferred onto a recording medium 108 at the transfer section. Now, the components of the inkjet recording apparatus that participate in the image transfer operation and the conditions under which the image transfer operation is conducted will be described below.

<Pressing Member for Image Transfer>

With this embodiment, the ink image on the transfer body 101, from which the liquid component has been removed, is then brought into contact with the recording medium 108, which is conveyed by the recording medium conveying device 107 to the image transfer position, by means of the pressing member 106 for image transfer and transferred onto the recording medium 108. As the ink image on the transfer body 101, from which the liquid component has been removed, is transferred onto the recording medium 108, it is possible to obtain a recorded image where the appearance of the phenomenon of curling and that of cocking are suppressed.

The pressing member 106 is required to show a certain degree of structural strength from the viewpoint of the conveyance speed of the recording medium 108 and the durability of the pressing member 106. Preferable materials that can be used for the pressing member 106 include metal materials, ceramic materials and polymer materials. In particular, preferable materials of the pressing member 106 include aluminum, iron, stainless steel, acetal resin, epoxy resin, polyimide, polyethylene, polyethylene terephthalate, nylon, polyurethane, silica ceramics and alumina ceramics from the viewpoint of securing rigidity and dimensional accuracy for withstanding the pressure in the image transfer operation, alleviating the inertia during the image transfer operation and improving the control response. Two or more of the above-listed materials may be used in combination.

While the pressing time during which the pressing member 106 presses the transfer body in order to transfer the ink image, from which liquid has been removed, from the transfer body 101 onto the recording medium 108 is not subject to any particular limitations, it is preferably not less than 5 ms and not more than 100 ms from the viewpoint of satisfactorily executing the transfer operation and not damaging the durability of the transfer body. The pressing time of this embodiment refers to the time period during which the recording medium 108 is held in contact with the transfer body 101. It is determined by observing the surface pressure by means of a surface pressure distribution measurement instrument ("I-SCAN": trade name, available from Nitta)

and dividing the length of the pressurized region in the conveyance direction by the conveyance speed.

The pressure applied onto the transfer body 101 by the pressing member 106 for the purpose of transferring the ink image after liquid removal on the transfer body 101 onto the recording medium 108 is not subject to any particular limitations so long as the transfer operation is satisfactorily executed and the durability of the transfer body is not damaged. Thus, the pressure is preferably not lower than 9.8 N/cm$^2$ (1 kg/cm$^2$) and not higher than 294.2 N/cm$^2$ (30 kg/cm$^2$). The pressure as used for this embodiment is the nip pressure between the recording medium 108 and the transfer body 101. It is determined by observing the surface pressure by means of a surface pressure distribution measurement instrument and dividing the load in the pressurized region by the area of the pressurized region.

While the temperature at which the transfer body 101 is pressed by the pressing member 106 for the purpose of transferring the ink image after liquid removal on the transfer body 101 onto the recording medium 108 is not subject to any particular limitations, it is preferably not lower than the glass transition point or the softening point of the polymer component contained in the ink when the ink contains a polymer component. The inkjet recording apparatus of this embodiment preferably includes a heating means for heating the second image on the transfer body 101, the transfer body 101 and the recording medium 108.

While the profile of the transfer means 106 is not subject to any particular limitations, the transfer means 106 may be roller-shaped for example.

<Recording Medium and Recording Medium Conveying Device>

For this embodiment, the recording medium 108 to be used is not subject to any particular limitations and any known recording medium may be used for this embodiment. Known recording mediums include wound rolls of long recording mediums and sheets of recording mediums cut to predetermined dimensions. Materials of recording mediums that can be used for this embodiment include paper, plastic film, wooden boards, cardboard and metal film.

While the recording medium conveying device 107 for conveying the recording medium 108 shown in FIGS. 3 and 4 is formed by using a recording medium feed roller 107a and a recording medium take-up roller 107b, the only requirement that the recording medium conveying device 107 is to satisfy is that it can convey a recording medium and the configuration of the recording medium conveying device is not limited to those shown in FIGS. 3 and 4.

<Control System>

Figure 6:
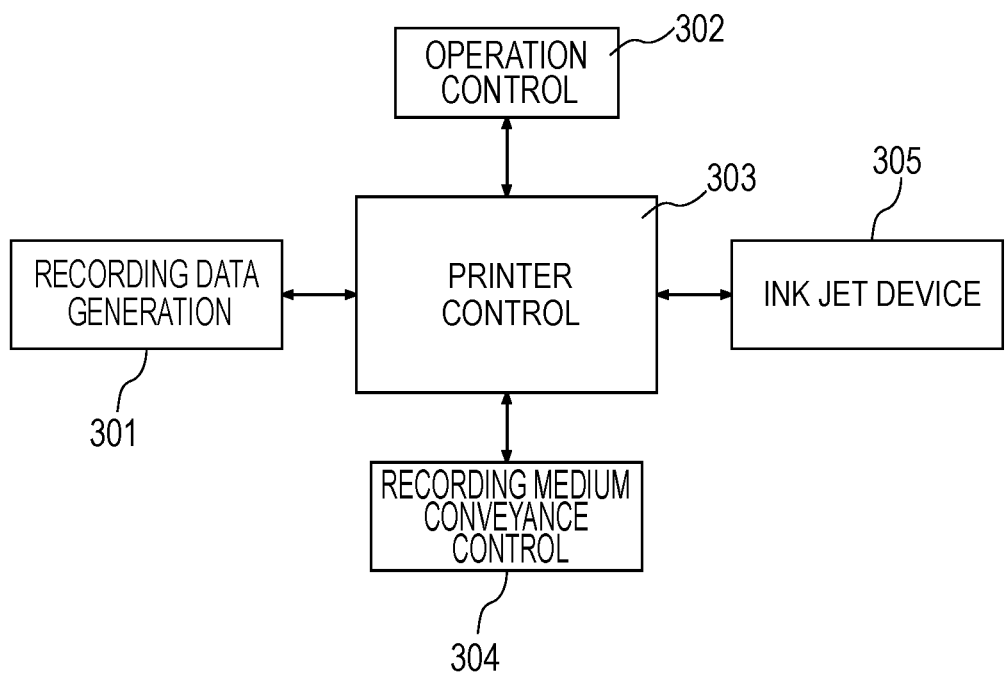
FIG. 6 is a schematic block diagram of the control system of the entire apparatus that is applicable to the inkjet recording apparatus shown in FIGS. 3, 4, and 5.

The transfer type inkjet recording apparatus of this embodiment includes a control system for controlling the component devices thereof. FIG. 6 is a block diagram of the control system of the entire transfer type inkjet recording apparatus shown in FIGS. 3 and 4.

In FIG. 6, 301 denotes a recording data generating section, which may typically be an external print server, 302 denotes an operation control section, which may typically be an operation panel, 303 denotes a printer control section for executing a recording process, 304 denotes a recording medium conveyance control section for conveying a recording medium and 305 denotes an inkjet device for printing operations.

Figure 7:
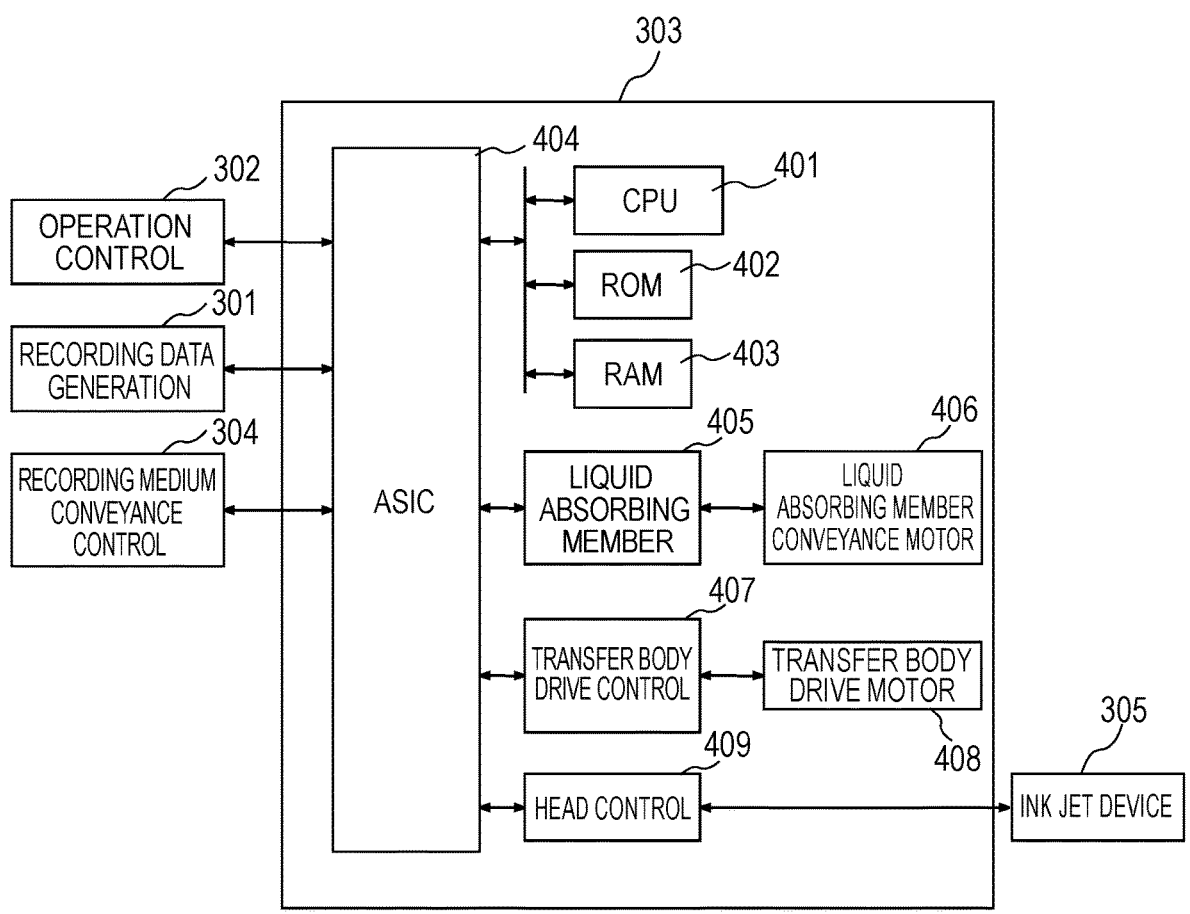
FIG. 7 is a schematic block diagram of the printer control section of the transfer type inkjet recording apparatus shown in FIGS. 3 and 4.

FIG. 7 is a block diagram of the printer control section of the transfer type inkjet recording apparatus shown in FIGS. 3 and 4.

In FIG. 7, 401 denotes a CPU for controlling the entire printer, 402 denotes a ROM for storing the control program of the CPU 401 and 403 denotes a RAM to be used for executing the control program. 404 denotes an application specific integrated circuit (ASIC) containing a network controller, a serial IF controller, an inkjet head data generation controller and a motor controller among others. 405 denotes a liquid absorbing member conveyance control section for driving liquid absorbing member conveying motor 406, which is command-controlled from the ASIC 404 by way of a serial IF. 407 denotes a transfer body drive control section for driving transfer body drive motor 408, which is also command-controlled from the ASIC 404 by way of the serial IF. 409 denotes an inkjet head control section that operates for generation of final ejection data of the inkjet device 305 and generation of the drive voltage among others.

<Direct Drawing Type Inkjet Recording Apparatus>

This embodiment may be realized as a direct drawing type inkjet recording apparatus. For direct drawing type inkjet recording apparatus, the ink receiving medium is the recording medium on which a final image is to be formed.

Figure 5:
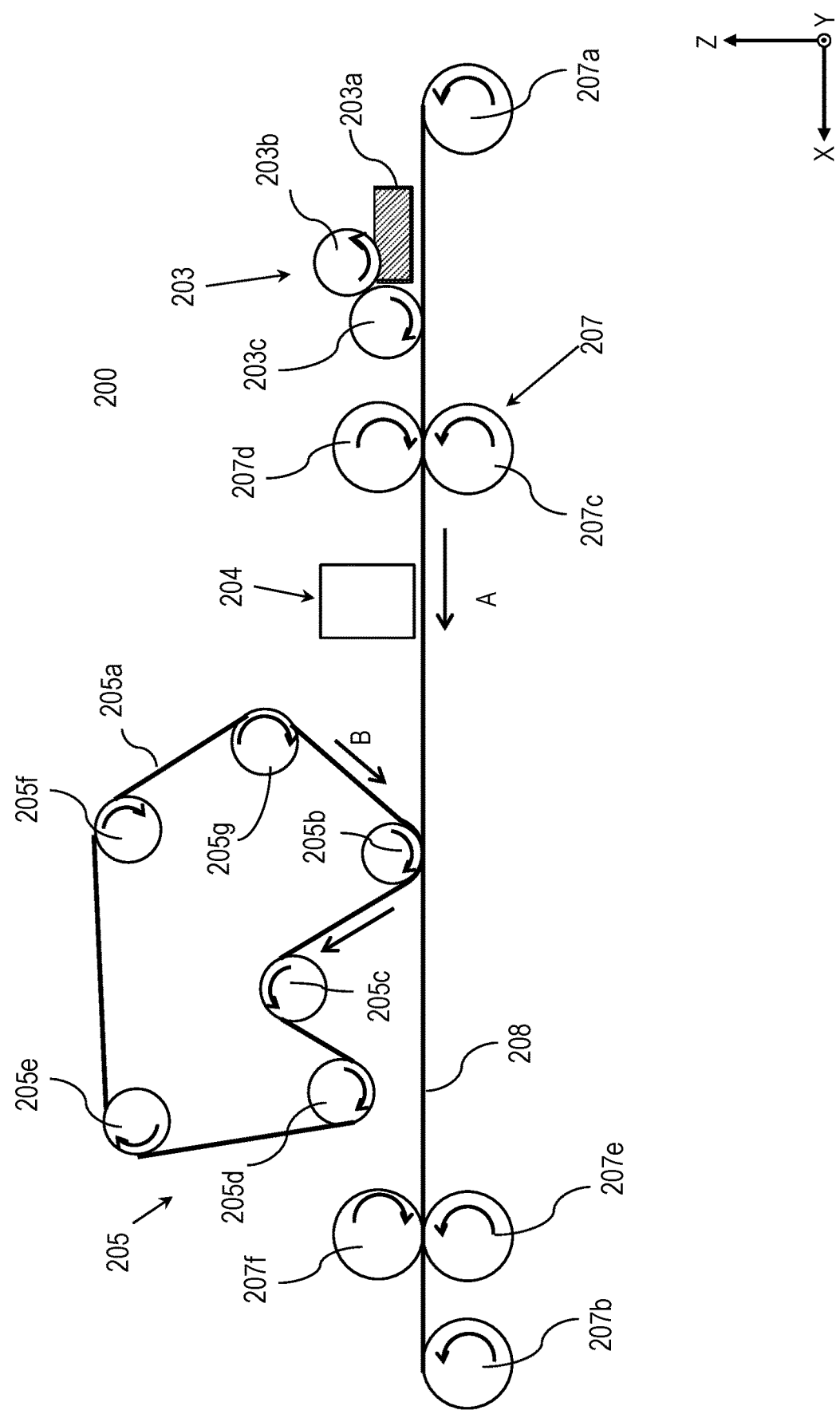
FIG. 5 is a schematic illustration of an exemplar configuration of an embodiment of the present invention, which is a direct drawing type inkjet recording apparatus.

FIG. 5 is a schematic illustration of the direct drawing type inkjet recording apparatus 200 of this embodiment, showing the configuration thereof. When compared with the above-described transfer type inkjet recording apparatus, this direct drawing type inkjet recording apparatus has a configuration similar to the configuration of the transfer type inkjet recording apparatus except that it does not include a transfer body 101, a supporting member 102 or a transfer body cleaning member 109 and directly forms an image on a recording medium 208.

Therefore, the reaction liquid applying device 203 including the reaction liquid container 203a and the reaction liquid applying members 203b and 203c for applying reaction liquid to the recording medium 208 and the ink applying device 204 for applying ink to the recording medium 208 are structurally same as their counterparts of the transfer type inkjet recording apparatus and hence will not be described here any further. The liquid absorption device 205 that absorbs the liquid component contained in the ink image on the recording medium 208 by means of the liquid absorbing member 205a that is to be brought into contact with the ink image on the recording medium 108 will not be described here either.

Note that, in this direct drawing type inkjet recording apparatus again, the liquid absorption device 205 includes a liquid absorbing member 205a and a pressing member 205b used for liquid absorption and pressing the liquid absorbing member 205a against the ink image on the recording medium 208. Also note that the profile of the liquid absorbing member 205a and that of the pressing member 205b are not subject to any particular limitations and hence a liquid absorbing member and a pressing member that can be used for the above-described transfer type inkjet recording apparatus according to the present invention can also be used for this direct drawing type inkjet recording apparatus. Additionally, the liquid absorption device 205 may include a stretching member for stretching the liquid absorbing member. In FIG. 5, 205c, 205d, 205e, 205f and 205g denote so many stretching rollers that operate as stretching member. The number of stretching rollers is not limited to five as shown in FIG. 6 and any number of stretching rollers may be provided according to the design of the apparatus.

Additionally, the ink applying section for applying ink onto the recording medium 208 by means of the ink applying device 204 and the liquid component removing section for removing the liquid component from the ink image on the recording medium by bringing the liquid absorbing member 205a into contact with the ink image may be provided with respective support members for supporting the recording medium from under (not shown).

<Recording Medium Conveying Device>

The recording medium conveying device 207 of the direct drawing type inkjet recording apparatus of this embodiment is not subject to any particular limitations and a conveyance means of any known direct drawing type inkjet recording apparatus may also be employed for this embodiment. As an example, a recording medium conveying device having a recording medium feed roller 207a, a recording medium take-up roller 207b and pairs of recording medium conveying rollers 207c, 207d, 207e and 207f as shown in FIG. 5 may be employed.

<Control System>

The direct drawing type inkjet recording apparatus of this embodiment has a control system for controlling each of the component devices. The block diagram of the control system shown in FIG. 6 and described above for the transfer type inkjet recording apparatus shown in FIGS. 3 and 4 is also applicable to the control system of the direct drawing type inkjet recording apparatus shown in FIG. 5.

Figure 8:
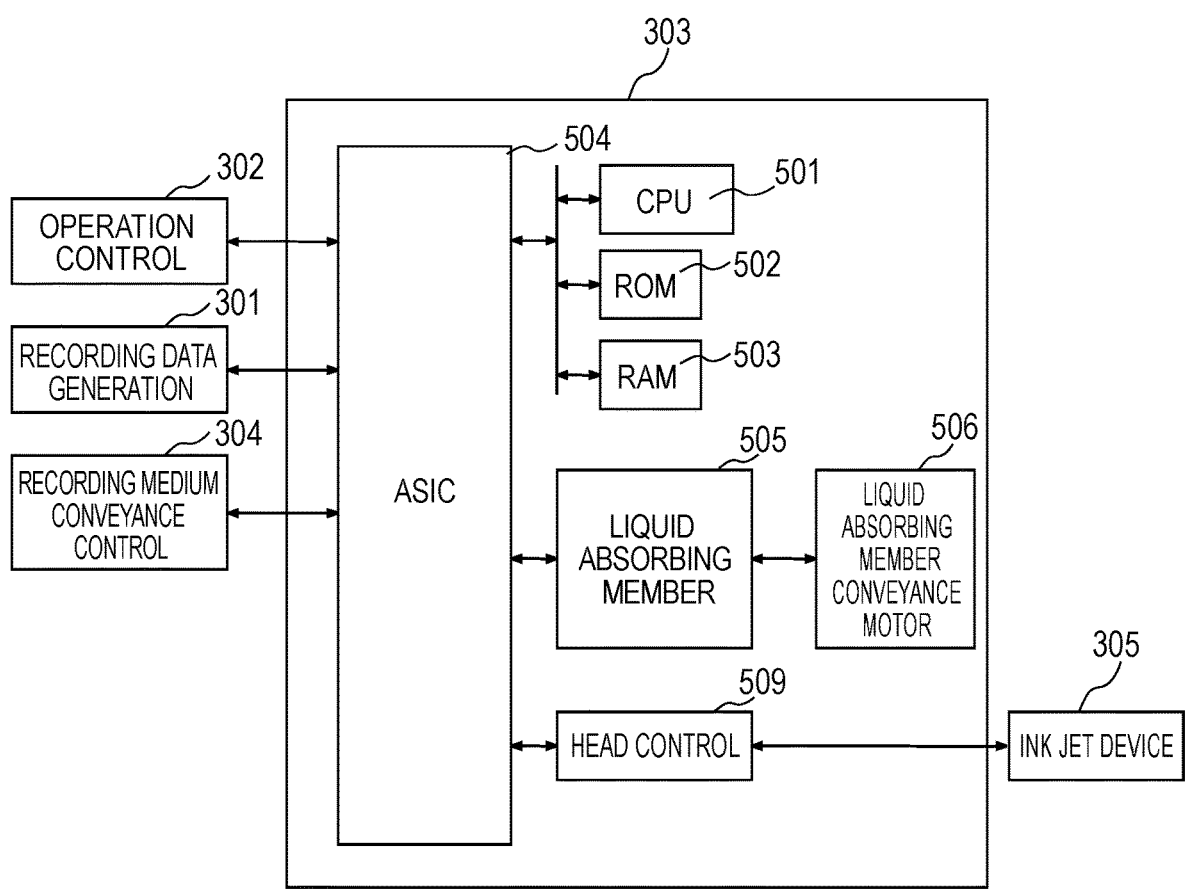
FIG. 8 is a schematic block diagram of the printer control section of the direct drawing type inkjet recording apparatus shown in FIG. 5.

FIG. 8 is a block diagram of the printer control section of the direct drawing type inkjet recording par shown in FIG. 5. The block diagram of FIG. 8 is similar to the block diagram of the printer control section of the transfer type inkjet recording apparatus shown in FIG. 6 except that the direct drawing type inkjet recording apparatus does not have a transfer body drive control section 407 or a transfer body drive motor 408.

Referring to FIG. 8, 501 denotes the CPU for controlling the entire printer, 502 denotes a ROM for storing the control program of the CPU and 503 denotes a RAM to be used for executing programs. 504 denotes an ASIC containing a network controller, a serial IF controller, an inkjet head data generation controller and a motor controller among others. 505 denotes a liquid absorbing member conveyance control section for driving liquid absorbing member conveying motor 506, which is command-controlled from the ASIC 504 by way of a serial IF. 509 denotes an inkjet head control section that operates for generation of final ejection data of the inkjet device 305 and generation of the drive voltage among others.

Thus, the present invention can provide an inkjet recording method and an inkjet recording apparatus that can suppress changes in the texture of an ink image.

[Examples]

Now, the above-described embodiment of the present invention will be described further in greater detail by way of examples and comparative examples. Note, however, the scope of the present invention is by no means limited by the examples unless departing from the spirit of the present invention. In the following description, "portions" are mass portions unless noted otherwise.

<Preparation of Reaction Liquid>

Reaction liquid having the composition as listed below is employed for the examples and the comparative examples. The expression of "balance" that comes after ion exchange water refers to the amount that makes the total of all the components of the reaction liquid equal to 100 mass %.
    glutaric acid: 21.0 mass %
    glycerin: 5.0 mass %
    surfactant: (Megaface 444: trade name, available from DIC): 5.0 mass %
    ion exchange water: balance <Preparation of Pigment Dispersion>

10 portions of carbon black (Monarch: trade name, available from Cabot), 15 portions of polymer aqueous solution (obtained by neutralizing aqueous solution of styrene-ethyl acrylate-acrylic acid copolymer, acid value 150, weight average molecular weight (Mw): 8,000, polymer content ratio: 20.0 mass % with aqueous solution of potassium hydroxide) and 75 portions of pure water were mixed with each other. Then, the mixture was put into a batch type vertical sand mill (available from Aimex) and the sand mill was filled with 200 portions of 0.3 mm size zirconia beads. The mixture was processed for dispersion for 5 hours, while being cooled with water. Then, the dispersion was centrifuged to remove rough grains and obtain a pigment dispersion whose pigment content ratio was 10.0 mass %.

<Preparation of Polymer Fine Particle Dispersion>

20 portions of butyl methacrylate, 3 portions of 2,2'-azobis-(2-methylbutyronitrile) and 2 portions of n-hexadecane was mixed and agitated for 0.5 hours. The mixture was then dropped into 75 portions of 8 mass % aqueous solution of styrene-butyl acrylate-acrylic acid copolymer (acid value: 130 mgKOH/g, weight average molecular weight (Mw): 7,000) and agitated for 0.5 hours. Then, the mixture was irradiated with ultrasonic waves by means of an ultrasonic irradiation device. Subsequently, the mixture was subjected to a polymerization reaction at 80° C. for 4 hours in a nitrogen atmosphere and cooled to room temperature to prepare a polymer fine particle dispersion whose polymer content ratio was 25.0 mass %.

<Preparation of Ink>

The pigment dispersion and the polymer fine particle dispersion as described above were mixed with the components listed below. The expression of "balance" that comes after ion exchange water refers to the amount that makes the total of all the components of the reaction liquid equal to 100 mass %.
    pigment dispersion: 40.0 mass %
    polymer fine particle dispersion: 25.0 mass %
    glycerin: 7.0 mass %
    polyethylene glycol (number average molecular weight (Mn): 1,000): 3.0 mass %
    surfactant: Acetylenol E100 (trade name, available from Kawaken Fine Chemicals): 0.5 mass %
    ion exchange water: balance The above-listed components were thoroughly agitated and dispersed. Thereafter, the dispersion was subjected to pressure filtration, using a microfilter (available from Fujifilm) of pore size of 3.0 μm, to prepare ink.

<Preparation of Porous Body>

The layers listed in Table 1 and respectively having the thicknesses, the average surface pore sizes and the surface arithmetic average roughnesses Ra also shown in Table 1 were prepared as the first layers.

All the first layers were stretch films made of polytetrafluoroethylene (PTFE). They were fibrillated porous bodies prepared by producing highly crystalized PTFE particles by way of an emulsion polymerization process and a compression molding process, stretching the particles at a temperature not higher than the melting point of PTFE and subsequently subjecting them to a hot press calendering.

TABLE 1

| Designation | Thickness (μm) | Average pore size (μm) | Ra (μm) |
|---|---|---|---|
| 1-A | 15 | 1.2 | 3.0 |
| 1-B | 11 | 0.8 | 2.7 |
| 1-C | 10 | 0.5 | 2.1 |

TABLE 1-continued

| Designation | Thickness (μm) | Average pore size (μm) | Ra (μm) |
|---|---|---|---|
| 1-D | 9 | 0.8 | 1.9 |
| 1-E | 10 | 0.5 | 2.1 |
| 1-F | 38 | 2.6 | 3.5 |
| 1-G | 4 | 0.8 | 0.9 |
| 1-H | 6 | 0.8 | 2.0 |

The layers listed in Table 2 and respectively having the average pore sizes and the average fiber diameters also shown in Table 2 were prepared as the second layers. All the second layers are films made of fibers including polyethylene (PE) fibers, which were the first material, and polypropylene (PP) fibers, which were the second material. The first material was a "sheath structure" and the second material was a "core structure and hence the first and second materials had a "core-sheath structure". Thus, the second layers were produced by a wet method, using fibers having a core-sheath structure.

TABLE 2

| Designation | Average pore size (μm) | Average fiber diameter |
|---|---|---|
| 2-A | 110 | 12 |
| 2-B | 40 | 8 |
| 2-C | 160 | 13 |
| 2-D | 200 | 13 |
| 2-E | 130 | 12 |

The layer shown in Table 3 and having the average pore size and the average fiber diameter also shown in Table 3 was prepared as the third layer. Just like the second layers, fibers having a "core-sheath structure", in which polyethylene (PE) had a "sheath structure" and polypropylene (PP) had a "core structure", were used.

TABLE 3

| Designation | Average pore size (μm) | Average fiber diameter |
|---|---|---|
| 3-A | 70 | 12 |

Table 4 below shows the combination of the first layer, the second layer and the third layer, which third layer was used only when necessary, used to form a porous body in each of the examples and comparative examples. The layers were laid one on the other and bonded to each other by thermocompression lamination. Then, the Gurley value of each of the obtained porous body per unit width was measured by the method described earlier.

Table 4 also shows the value obtained by dividing the thickness of the first layer by the average pore size of the second layer and the Gurley value of the porous body of each of the examples and comparative examples. Note that the arithmetic average roughness Ra of the first layer that is to be brought into contact with an ink image prior to liquid removal of each of the porous bodies is the same as the arithmetic average roughness Ra of the surface of the first layer prior to the lamination.

TABLE 4

| | first layer | second layer | third layer | quotient of division of 1st layer thickness by arithmetic average pore size of 2nd layer | Gurley value (second) |
|---|---|---|---|---|---|
| Example 1 | 1-A | 2-A | none | 0.14 | 12.5 |
| Example 2 | 1-B | 2-A | none | 0.10 | 10.5 |
| Example 3 | 1-B | 2-E | none | 0.08 | 10.5 |
| Example 4 | 1-C | 2-A | none | 0.09 | 14.5 |
| Example 5 | 1-C | 2-A | none | 0.09 | 14.5 |
| Example 6 | 1-D | 2-A | none | 0.08 | 12.5 |
| Example 7 | 1-B | 2-B | none | 0.28 | 11.5 |
| Example 8 | 1-E | 2-B | 3-A | 0.25 | 16.0 |
| Example 9 | 1-F | 2-B | 3-A | 0.95 | 10.0 |
| Ex comp 1 | 1-D | 2-E | none | 0.07 | 12.5 |
| Ex comp 2 | 1-G | 2-A | none | 0.04 | 4.5 |
| Ex comp 3 | 1-H | 2-A | none | 0.05 | 6.5 |
| Ex comp 4 | 1-B | 2-C | none | 0.07 | 10.3 |
| Ex comp 5 | 1-B | 2-D | none | 0.06 | 10.2 |

<Inkjet Recording Apparatus and Image Formation>

A transfer type inkjet recording apparatus as shown in FIG. 3 was used. The transfer body 101 was rigidly secured to the surface of the support member 102 by means of a double-sided sticky tape. A sheet obtained by coating a 0.5 mm-thick PET sheet with silicone robber (KE12: trade name, available from Shin-Etsu Chemical) to a thickness of 0.3 mm was employed as the elastic layer of the transfer body 101. Additionally, a mixture of a condensate obtained by mixing glycidoxypropyltriethoxysilane and methyltriethoxysilane with each other at a molar ratio of 1:1 and heating and refluxing them and a photo-cationic polymerization initiator (SP150: trade name, available from ADEKA) was prepared. The elastic layer was subjected to atmospheric pressure plasma processing so as to make the contact angle of the surface of the elastic layer to be not greater than 10° relative to water. Subsequently, the mixture was applied to the surface of the elastic layer and turned into a film layer by way of UV irradiation (using high pressure mercury lamp, integrated exposure: 5,000 mJ/cm$^2$) and thermosetting (150° C., 2 hours) to prepare a transfer body 101 having a 0.5 μm-thick surface layer on the elastic layer thereof. The surface of the transfer body 101 was held to 60° C. by a heating means (not shown).

The amount of reaction liquid applied per unit area by the reaction liquid applying device 103 was made to be equal to 0.5 g/m$^2$. An inkjet recording head having electrothermal transducer and designed to eject ink on an on-demand basis was employed and a solid image was formed on the transfer body as ink image prior to liquid removal. The amount of ink applied per unit area by the ink applying device for the image formation was 13 g/cm$^2$. Prior to the use of the liquid absorbing member 105a having the porous body at the side thereof that was to be brought into contact with the ink image prior to liquid removal, it was immersed in wetting liquid prepared by using 95 portions of ethanol and 5 portions of water and the wetting liquid was allowed to penetrate into the porous body. Subsequently, the wetting liquid was replaced with water. Pressure was applied by means of the pressing member 105b to make the average nip pressure between the transfer body 101 and the liquid absorbing member 105a to be equal to 3 kg/cm'. The diameter of the pressing member 105b was 250 mm. The aqueous liquid component absorbed by the porous body as the porous body was brought into contact with the ink image was at least partly removed from the porous body before the porous body was brought into contact with the ink image for another time. The conveyance speed of the liquid absorbing member 105a was adjusted by the stretching rollers 105c, 105d and 105e that conveyed the liquid absorbing member 105a, while stretching them, so as to become substantially equal to the moving speed of the transfer body 101. Additionally, the recording medium 108 was conveyed by means of the recording medium feed roller 107a and the recording medium take-up roller 107b so as to make the conveyance speed thereof to be substantially equal to the moving speed of the of the transfer body 101. The conveyance speed of the recording medium 108 was made to be 0.15 m/s. Aurola Coat paper (trade name, available from Nippon Paper Industries, basis weight: 104 g/m$^2$) was used for the recording medium 108.

[Evaluation]

The operations of the inkjet recording apparatus in the examples and comparative examples were evaluated, using the rating system as described below. Table 5 shows the results of the evaluations. For the purpose of the present invention, for each of the evaluation items listed below, ratings from AA down to B were defined as acceptable.

<Image Texture>

For the images formed by way of the above-described image formation process in each of the examples and comparative examples, the change in the image texture that was observed after the contact of the liquid absorbing member 105a to the ink image was observed. More specifically, in each of the examples and comparative examples, ten (10) sheets of recording medium, each showing a solid image formed on it, were prepared and the texture of the image formed on the first sheet (the image produced after bringing the porous body of the liquid absorbing member into contact with the ink image one time) and the texture of the image formed on the tenth sheet (the image produced after bringing the porous body of the liquid absorbing member into contact with the ink image ten times) were compared with each other and evaluated. The following rating system was used for the evaluation.

AA: No change was observed between the textures of the images after the repeated use of the porous body of the liquid absorbing member (the ten contacts of the porous body of the liquid absorbing member with the ink images).

A: No change was observed between the textures of the images.

B: A slight change was observed between the textures of the images but not to an unpleasant extent.

C: Change was observed between the textures of the images at a plurality of locations in the images.

<Image Smearing>

The extent of move of the coloring material, or the image smearing, at an end of each of the ink images formed by way of the above-described image formation process after removing the liquid component from the ink image was observed. More specifically, ten recording mediums, each showing a solid image formed thereon, were prepared in each of the examples and comparative examples by way of the image formation process and evaluated for image smearing. The following rating system was used for the evaluation.

AA: No image smearing was observed in the image on the tenth sheet of recording medium obtained after the repeated use (the ten contacts of the porous body of the liquid absorbing member with the ink images).

A: A slight image smearing was observed in the image on the tenth sheet of recording medium after repeated use (ten contacts of the porous body of the liquid absorbing member with the ink images) but not to an unpleasant extent.

B: A slight image smearing was observed in the image on the first sheet of recording medium after a single liquid removal operation (a single contact of the porous body of the liquid absorbing member with the ink image) but not to an unpleasant extent.

C: Image smearing was observed in the image on the first sheet of recording medium after a single liquid removal operation (a single contact of the porous body of the liquid absorbing member with the ink image).

<Conveyance Strength>

The liquid absorbing member 105a was checked for deformation due to the stress applied to it at the time of conveyance thereof in the above-described image formation process. The following rating system was used for the evaluation.

A: No plastic deformation was recognizable even when high stress was applied at the time of high speed conveyance.

B: No plastic deformation was recognizable.

C: Plastic deformation was recognizable.

TABLE 5

|  | image texture change | image smearing | conveyance strength |
|---|---|---|---|
| Example 1 | B | B | A |
| Example 2 | B | B | A |
| Example 3 | B | B | A |
| Example 4 | A | B | A |
| Example 5 | A | B | A |
| Example 6 | AA | B | B |
| Example 7 | AA | B | AA |
| Example 8 | A | A | AA |
| Example 9 | AA | AA | AA |
| Ex comparative 1 | C | B | A |
| Ex comparative 2 | C | AA | A |
| Ex comparative 3 | C | A | A |
| Ex comparative 4 | C | B | A |
| Ex comparative 5 | C | B | A |

An experiment similar to the above experiment using a transfer type inkjet recording apparatus was executed by using a direct drawing type inkjet recording apparatus as shown in FIG. 5. Gloria Pure White paper (trade name, available from Gojo Paper Mfg., basis weight: 210 g/m$^2$) was used as recording medium 208 for the image formations by the direct drawing type inkjet recording apparatus. The items other than the recording medium 208 including reaction liquid, the reaction liquid applying device 203, ink, the ink applying device 204, the conveyance speed for conveying the recording medium 208 and the liquid absorbing device 205 were similar to those used for the transfer type inkjet recording apparatus in Example 1 and the obtained results were evaluated as in Example 1. Consequently, it was confirmed that the obtained evaluation results were similar to those in Example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-131557, filed Jul. 4, 2017, which is hereby incorporated by reference herein in its entirety.

What is claimed is:

1. An inkjet recording apparatus comprising:
   an ink image forming unit for forming an ink image on an ink receiving medium by applying ink and a reaction liquid for increasing viscosity of the ink onto the ink receiving medium; and
   a liquid absorbing member having a porous body to be brought into contact with the ink image in order to absorb at least part of a liquid component from the ink image,
   the porous body including:
   a first layer having a first surface to be brought into contact with the ink image and a second surface that is a rear surface relative to the first surface; and
   a second layer held in contact with the second surface of the first layer,
   wherein the second layer has an average pore diameter and the first layer has a thickness that is not less than 0.08 times of the average pore diameter of the second layer.

2. The apparatus according to claim 1, wherein the first layer has an average pore diameter that is not more than 0.6 µm.

3. The apparatus according to claim 1, wherein the first surface of the first layer has an arithmetic average roughness Ra that is not more than 2.0 µm.

4. The apparatus according to claim 1, wherein the second layer contains fibers having an average fiber diameter that is 3 µm to 20 µm.

5. The apparatus according to claim 1, wherein the porous body has a Gurley value that is not more than 10 seconds.

6. The apparatus according to claim 1, wherein the thickness of the first layer is not more than 40 µm.

7. The apparatus according to claim 1, wherein the second layer contains fibers having a core-sheath structure.

8. The apparatus according to claim 1, wherein the porous body has a support layer supporting the first layer and the second layer.

9. The apparatus according to claim 8, wherein the support layer contains fibers having a core-sheath structure.

10. The apparatus according to claim 1, wherein the ink image forming unit has:
    a reaction liquid applying device for applying the reaction liquid to the ink receiving medium; and
    an ink applying device for applying the ink to the ink receiving medium.

11. The apparatus according to claim 1, wherein:
    the ink receiving medium is a transfer body for temporarily holding the ink image; and
    the apparatus further comprises a transfer unit having a pressing member for transferring the ink image after being brought into contact with the porous body onto a recording medium for forming a final image thereon.

12. The apparatus according to claim 1, wherein the ink receiving medium is a recording medium for forming a final image thereon.

13. The apparatus according to claim 1, wherein the thickness of the first layer is 0.08 times to 2 times the average pore diameter of the second layer.

14. The apparatus according to claim 1, wherein the average pore diameter of the second layer is 10 µm to 80 µm.

15. The apparatus according to claim 1, wherein the first layer contains a water-repellent material having a contact angle of not less than 90° relative to water.

16. An inkjet recording method comprising:
    an ink image forming step of forming an ink image by applying ink and a reaction liquid for increasing viscosity of the ink onto an ink receiving medium; and
    a liquid absorbing step of causing a porous body for absorbing at least part of a liquid component contained in the ink image to contact the ink image,
    the porous body including:
    a first layer having a first surface to be brought into contact with the ink image and a second surface that is a rear surface relative to the first surface; and
    a second layer held in contact with the second surface of the first layer,
    wherein the second layer has an average pore diameter and the first layer has a thickness that is not less than 0.08 times of the average pore diameter of the second layer.

17. The method according to claim 16, wherein:
    the ink receiving medium is a transfer body for temporarily holding the ink image; and
    the method further comprises a step of transferring the ink image after being brought into contact with the porous body onto a recording medium for forming a final image thereon.

18. The method according to claim 16, wherein the ink receiving medium is a recording medium for forming a final image thereon.

19. The method according to claim 16, wherein the thickness first layer is 0.08 times to 2 times the average pore diameter of the second layer.

20. The method according to claim 16, wherein the average pore diameter of the second layer is 10 µm to 80 µm.

21. The method according to claim 16, wherein the first layer contains a water-repellent material having a contact angle of not less than 90° relative to water.

* * * * *